US009544413B2

United States Patent
Sudo et al.

(10) Patent No.: US 9,544,413 B2
(45) Date of Patent: Jan. 10, 2017

(54) ELECTRONIC DEVICE, CONTROL METHOD, AND CONTROL PROGRAM

(71) Applicant: KYOCERA CORPORATION, Kyoto-shi, Kyoto (JP)

(72) Inventors: Tomohiro Sudo, Yokohama (JP); Koichi Ando, Yokohama (JP); Kenji Ishibashi, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/398,394

(22) PCT Filed: Apr. 25, 2013

(86) PCT No.: PCT/JP2013/062290
§ 371 (c)(1),
(2) Date: Oct. 31, 2014

(87) PCT Pub. No.: WO2013/164980
PCT Pub. Date: Nov. 7, 2013

(65) Prior Publication Data
US 2015/0119109 A1 Apr. 30, 2015

(30) Foreign Application Priority Data
May 2, 2012 (JP) ................. 2012-105502

(51) Int. Cl.
*H04M 1/725* (2006.01)
*H04M 19/04* (2006.01)
(Continued)

(52) U.S. Cl.
CPC ............ *H04M 1/72519* (2013.01); *B06B 1/06* (2013.01); *B06B 1/0644* (2013.01); *H04M 1/24* (2013.01);
(Continued)

(58) Field of Classification Search
CPC ............ H04M 19/047; H04M 1/72519; H04M 1/72563; H04M 1/03; H04R 1/2807; H04R 7/045; B06B 1/06; B06B 1/0644

See application file for complete search history.

(56) References Cited

U.S. PATENT DOCUMENTS 6,304,434 B1 * 10/2001 Markow ............... G06F 1/1616
312/223.1
8,351,991 B2 * 1/2013 Komiya .................. G06F 3/016
455/566

(Continued)

FOREIGN PATENT DOCUMENTS

JP 2002-281578 A 9/2002
JP 2005-348193 A 12/2005

(Continued)

OTHER PUBLICATIONS

International Search Report mailed Jul. 9, 2013, in corresponding International Application No. PCT/JP2013/062290.

(Continued)

*Primary Examiner* — Andrew Wendell
(74) *Attorney, Agent, or Firm* — Hauptman Ham, LLP

(57) ABSTRACT

According to an aspect, an electronic device includes: a piezoelectric element; and a sound generating unit that is vibrated by the piezoelectric element and generates a vibration sound transmitted by vibrating part of a human body. The electronic device notifies a user of a specific position in the sound generating unit.

19 Claims, 22 Drawing Sheets

(51) Int. Cl.
*H04R 7/04* (2006.01)
*B06B 1/06* (2006.01)
*H04M 1/24* (2006.01)
*H04M 1/03* (2006.01)

(52) U.S. Cl.
CPC ......... *H04M 1/72563* (2013.01); *H04M 19/04* (2013.01); *H04R 7/045* (2013.01); *H04M 1/03* (2013.01); *H04M 2250/12* (2013.01); *H04R 2430/01* (2013.01); *H04R 2460/07* (2013.01); *H04R 2460/13* (2013.01); *H04R 2499/11* (2013.01); *H04R 2499/15* (2013.01)

(56) References Cited

U.S. PATENT DOCUMENTS

| | | | |
|---|---|---|---|
| 2006/0099996 A1 | 5/2006 | Kanai | |
| 2010/0315364 A1* | 12/2010 | Miyake | G06F 3/041 345/173 |
| 2011/0103627 A1* | 5/2011 | Meier | H04R 25/04 381/314 |
| 2012/0057730 A1* | 3/2012 | Fujise | H04R 17/00 381/190 |
| 2012/0153775 A1* | 6/2012 | Park | G06F 3/016 310/326 |
| 2013/0134832 A1* | 5/2013 | Shen | B06B 1/06 310/318 |
| 2013/0137491 A1* | 5/2013 | Tanaka | H04W 52/00 455/569.1 |
| 2013/0259221 A1* | 10/2013 | Shusaku | H04M 1/6016 379/390.01 |
| 2015/0043748 A1* | 2/2015 | Sudo | H04R 17/00 381/102 |
| 2015/0043758 A1* | 2/2015 | Yamada | G10K 11/178 381/151 |
| 2015/0104047 A1* | 4/2015 | Izumi | H04M 1/03 381/162 |
| 2015/0346666 A1* | 12/2015 | Tanaka | G03G 15/5016 399/81 |

FOREIGN PATENT DOCUMENTS

| | | |
|---|---|---|
| JP | 2006-135858 A | 5/2006 |
| JP | 2010-233103 A | 10/2010 |
| JP | 2011-205417 A | 10/2011 |
| JP | 2011-233971 A | 11/2011 |
| JP | 2013-118497 A | 6/2013 |

OTHER PUBLICATIONS

Office Action mailed Aug. 4, 2015, corresponding to Japanese patent application No. 2012-105502.

\* cited by examiner

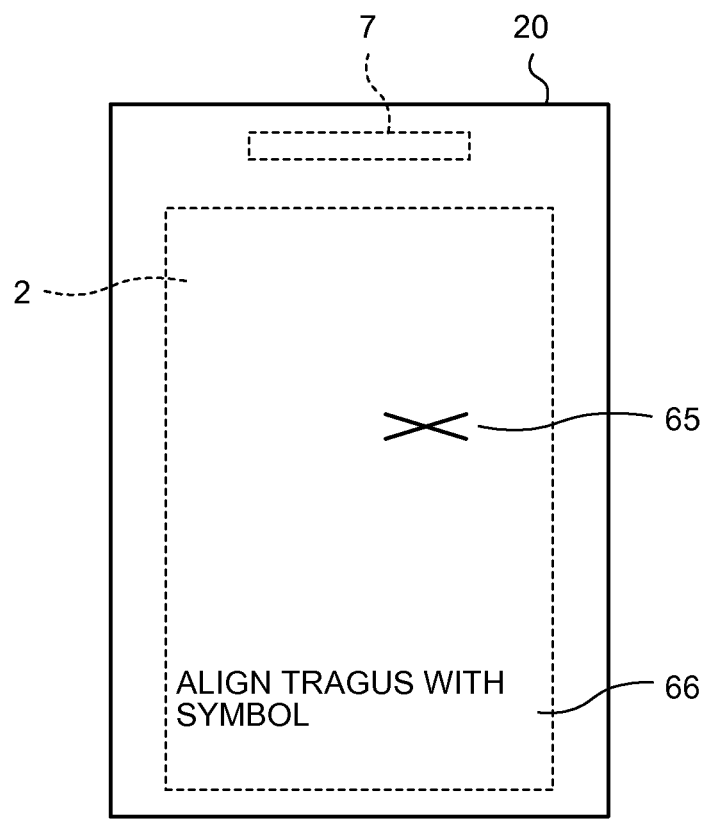

FIG.9A

| DISTANCE | TO 40 | 40 TO 60 | 60 TO 80 | 80 TO 100 | 100 TO |
|---|---|---|---|---|---|
| SOUND VOLUME | STANDARD | -10 | -20 | -30 | -50 |

FIG.9B

| HIGH-PITCHED/ LOW-PITCHED | | X-AXIS DIRECTION | | | | |
|---|---|---|---|---|---|---|
| | | TO 40 | 40 TO 60 | 60 TO 80 | 80 TO 100 | 100 TO |
| Y-AXIS DIRECTION | TO 40 | STANDARD/ STANDARD | -10/ STANDARD | -20/ STANDARD | -30/ STANDARD | -50/ STANDARD |
| | 40 TO 60 | STANDARD/ -10 | -10/-10 | -20/-10 | -30/-10 | -50/-10 |
| | 60 TO 80 | STANDARD/ -20 | -10/-20 | -20/-20 | -30/-20 | -50/-20 |
| | 80 TO 100 | STANDARD/ -30 | -10/-30 | -20/-30 | -30/-30 | -50/-30 |
| | 100 TO | STANDARD/ -50 | -10/-50 | -20/-50 | -30/-50 | -50/-50 |

ALIGN TRAGUS WITH SYMBOL

US 9,544,413 B2

ELECTRONIC DEVICE, CONTROL METHOD, AND CONTROL PROGRAM

CROSS-REFERENCE TO RELATED APPLICATION

The present application is a National Phase of International Application Number PCT/JP2013/062290 filed on Apr. 25, 2013, and claims the benefit of priority from Japanese Patent Application No. 2012-105502 filed on May 2, 2012.

FIELD

The present application relates to an electronic device, a control method, and a control program.

BACKGROUND

Patent Literature 1 discloses an electronic device for transmitting an air conduction sound and a vibration sound to a user. Patent Literature 1 discloses that, when a voltage is applied to a piezoelectric element of an oscillator arranged at an outer surface of a housing of the electronic device, the piezoelectric element is expanded and contracted, so that the oscillator is flexurally vibrated. Patent Literature 1 also discloses that the air conduction sound and the vibration sound are transmitted to the user when the user brings the oscillator being flexurally vibrated into contact with an auricle. According to Patent Literature 1, the air conduction sound is a sound transmitted to an auditory nerve of the user when vibration of air caused by vibration of an object is transmitted to an eardrum through an external auditory meatus and the eardrum is vibrated. According to Patent Literature 1, the vibration sound is a sound transmitted to the auditory nerve of the user via part of a body of the user (for example, a cartilage of an external ear) that makes contact with a vibrating object.

CITATION LIST

Patent Literature

Patent Literature 1: Japanese Patent Application Laid-open No. 2005-348193

Technical Problem

In general, it is preferable for a user of an electronic device to find a position at which the user can easily hear a sound.

SUMMARY

According to an aspect, an electronic device includes: a piezoelectric element; and a sound generating unit that is vibrated by the piezoelectric element and generates a vibration sound transmitted by vibrating part of a human body. The electronic device notifies a user of a specific position in the sound generating unit.

According to another aspect, a method is performed by an electronic device that includes a sound generating unit and a piezoelectric element. The control method includes: notifying a user of a specific position in the sound generating unit; and generating a vibration sound to be transmitted by vibrating part of a human body, by vibrating the sound generating unit with the piezoelectric element.

According to another aspect, a control program causes an electronic device that includes a sound generating unit and a piezoelectric element to execute: notifying a user of a specific position in the sound generating unit; and generating a vibration sound to be transmitted by vibrating part of a human body, by vibrating the sound generating unit with the piezoelectric element.

BRIEF DESCRIPTION OF DRAWINGS

FIG. 6C is a diagram for explaining guidance that is performed before contact.
FIG. 9A is a diagram illustrating an example of changing control.
FIG. 9B is a diagram illustrating an example of changing control.

DESCRIPTION OF EMBODIMENTS

The following describes embodiments of the present invention in detail with reference to the drawings. Herein-after, the mobile phone will be described as an example of an electronic device for transmitting an air conduction sound and a vibration sound to a user.

First Embodiment

Figure 1:
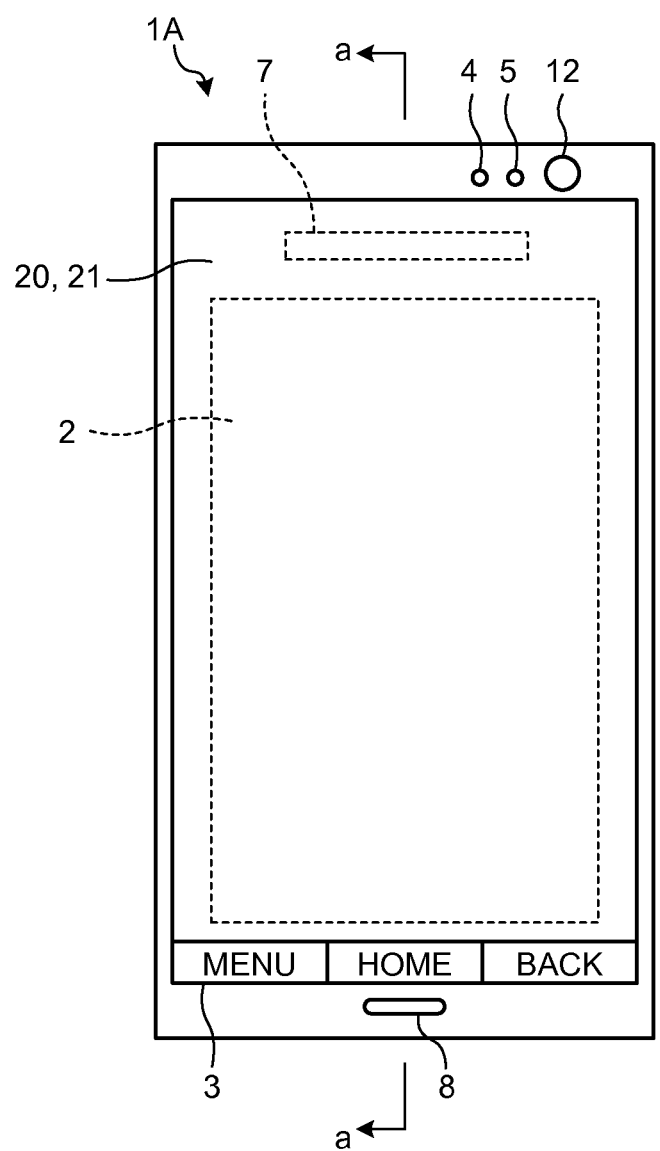
FIG. 1 is a front view of a mobile phone according to an embodiment.
Figure 2:
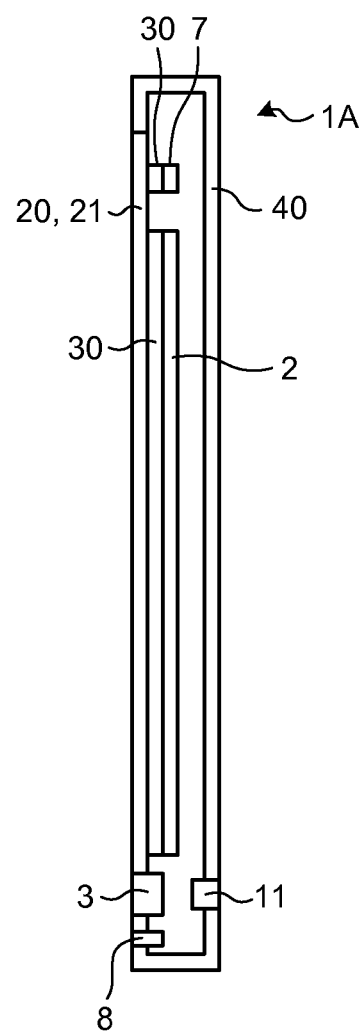
FIG. 2 is a cross-sectional view of the mobile phone according to the embodiment.

With reference to FIG. 1 and FIG. 2, the following describes the overall configuration of a mobile phone 1A according to the embodiment. FIG. 1 is a front view of the mobile phone 1A. FIG. 2 is a cross-sectional view schematically illustrating a cross-section along a-a line of the mobile phone 1A. As illustrated in FIG. 1 and FIG. 2, the mobile phone 1A includes a display 2, buttons 3, an illuminance sensor 4, a proximity sensor 5, a piezoelectric element 7, a microphone 8, a camera 12, a panel 20, and a housing 40.

The display 2 includes a display device such as a liquid crystal display (LCD), an organic electro-luminescence display (GELD), or an inorganic electro-luminescence display (IELD). The display 2 displays a character, an image, a symbol, a figure, and the like.

Each of the buttons 3 receives an operation input from a user. The number of buttons 3 is not limited to the example illustrated in FIG. 1 and FIG. 2.

The illuminance sensor 4 detects an illuminance of ambient light around the mobile phone 1A. The illuminance represents intensity, brightness, or luminance of the light. The illuminance sensor 4 is used, for example, to adjust luminance of the display 2. The proximity sensor 5 detects presence of a neighboring object in a non-contact state. The proximity sensor 5 detects presence of an object based on a change in a magnetic field, a change in returning time of a reflected wave of an ultrasonic wave, or the like. The proximity sensor 5 detects that, for example, the display 2 is brought close to a face. The illuminance sensor 4 and the proximity sensor 5 may be configured as one sensor. The illuminance sensor 4 may be used as a proximity sensor.

When an electric signal (voltage corresponding to a sound signal) is applied, the piezoelectric element 7 expands/contracts or bends according to an electromechanical coupling coefficient of a component material. That is, the piezoelectric element 7 is deformed when the electric signal is applied thereto. The piezoelectric element 7 is attached to the panel 20, and used as a vibration source for vibrating the panel 20. The piezoelectric element 7 is formed of, for example, ceramic or crystal. The piezoelectric element 7 may be a unimorph, a bimorph, or a laminated piezoelectric element. The laminated piezoelectric element includes a laminated bimorph element formed by laminating bimorphs (for example, laminated by sixteen layers or twenty-four layers). The laminated piezoelectric element includes, for example, a laminated structure of a plurality of dielectric layers formed of lead zirconate titanate (PZT) and electrode layers each arranged between the dielectric layers. The unimorph expands and contracts when the electric signal (voltage) is applied thereto. The bimorph bends when the electric signal (voltage) is applied thereto.

The microphone 8 is a sound input unit. The microphone 8 converts an input sound into the electric signal. The speaker 11 is a sound output unit that outputs a sound using an air conduction system. The speaker 11 is, for example, a dynamic speaker, and can transmit the sound converted from the electric signal to a person whose ear is not in contact with the mobile phone 1A. The speaker 11 is used, for example, to output music.

The camera 12 is an in-camera that photographs an object facing the display 2. The camera 12 converts a photographed image into the electric signal. The mobile phone 1A may include, in addition to the camera 12, an out-camera that photographs an object facing a surface opposed to the display 2.

The panel 20 is vibrated corresponding to the deformation (expansion/contraction or bend) of the piezoelectric element 7, and transmits the vibration to a cartilage of the ear (auricular cartilage) and the like that is brought into contact with the panel 20 by the user. The panel 20 also has a function for protecting the display 2, the piezoelectric element 7, and the like from an external force. The panel 20 is formed of, for example, glass or synthetic resins such as acrylic. The panel 20 has, for example, a plate-shape. The panel 20 may be a flat plate. The panel 20 may be a curved surface panel of which surface is smoothly curved.

The display 2 and the piezoelectric element 7 are attached to the back surface of the panel 20 with a joining member 30. The piezoelectric element 7 is spaced at a predetermined distance from an inner surface of the housing 40 in a state of being arranged on the back surface of the panel 20. The piezoelectric element 7 is preferably spaced from the inner surface of the housing 40 also in a state of being expanded/contracted or bent. That is, the distance between the piezoelectric element 7 and the inner surface of the housing 40 may be larger than a maximum deformation amount of the piezoelectric element 7. The piezoelectric element 7 may be attached to the panel 20 via a reinforcing member (for example, sheet metal or glass fiber reinforced resin). The joining member 30 is, for example, a double-sided tape or an adhesive agent having a thermosetting property, ultraviolet curability, or the like. The joining member 30 may be photo-elastic resin that is a colorless and transparent acrylic ultraviolet-curable adhesive agent.

The display 2 is arranged at substantially the center in the lateral direction of the panel 20. The piezoelectric element 7 is arranged at a nearby position spaced at a predetermined distance from an end in the longitudinal direction of the panel 20 so that the longitudinal direction of the piezoelectric element 7 is parallel to the lateral direction of the panel 20. The display 2 and the piezoelectric element 7 are arranged in parallel with each other on an inner surface of the panel 20.

A touch screen (touch sensor) 21 is arranged on substantially the entire outer surface of the panel 20. The touch screen 21 detects contact with the panel 20. The touch screen 21 is used for detecting a contact operation by the user with a finger, a pen, a stylus pen, or the like. Examples of a gesture detected by using the touch screen 21 include, but are not limited to, touch, long touch, release, swipe, tap, double tap, long tap, drag, flick, pinch-in, and pinch-out. A detection system of the touch screen 21 may be any of an electrostatic capacitance system, a resistance film system, a surface acoustic wave system (or an ultrasonic system), an infrared system, an electromagnetic induction system, a load detection system, and the like.

The touch screen 21 is also used for detecting an auricular cartilage or the like that is brought into contact with the panel 20 to listen to the sound.

The housing 40 is made of resin or metal. The housing 40 supports the buttons 3, the illuminance sensor 4, the proximity sensor 5, the microphone 8, the speaker 11, the camera 12, the panel 20, and the like.

Figure 3:
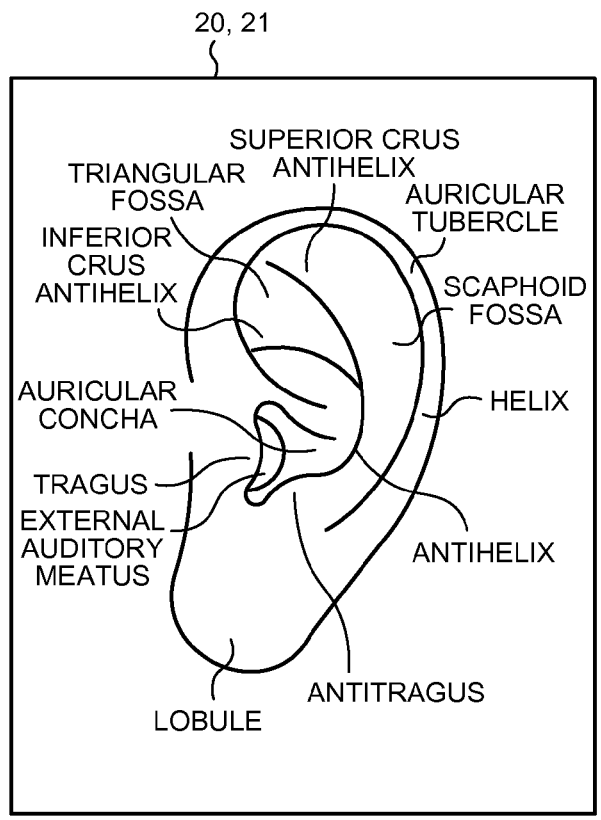
FIG. 3 is a diagram illustrating an example of a shape of a panel.
Figure 4:
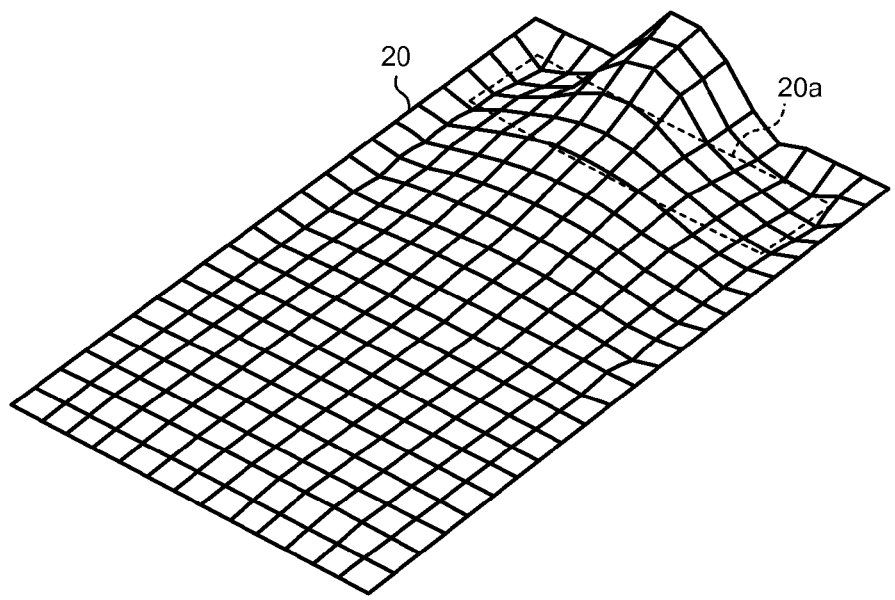
FIG. 4 is a diagram illustrating an example of vibration of the panel.

The following describes a sound output by the mobile phone 1A according to the embodiment in more detail with reference to FIG. 1 to FIG. 4. FIG. 3 is a diagram illustrating an example of the shape of the panel 20. FIG. 4 is a diagram illustrating an example of the vibration of the panel 20.

An electric signal corresponding to the output sound is applied to the piezoelectric element 7. For example, a voltage of ±15 V, which is higher than ±5 V as an applied voltage of what is called a panel speaker that transmits a sound using an air conduction sound via the external auditory meatus, may be applied to the piezoelectric element 7. Accordingly, for example, even when the user presses part of his/her body against the panel 20 with a force of 3 N or more (force of 5 N to 10 N), the panel 20 is sufficiently vibrated to generate a vibration sound to be transmitted via the part of the user's body. The voltage applied to the piezoelectric element 7 can be appropriately adjusted according to fixing strength of the panel 20 to the housing 40, performance of the piezoelectric element 7, or the like.

When the electric signal is applied, the piezoelectric element 7 is expanded/contracted or bent in the longitudinal direction. The panel 20 to which the piezoelectric element 7 is attached is deformed corresponding to the expansion/contraction or bend of the piezoelectric element 7. Due to this, the panel 20 is vibrated and generates the air conduction sound. When the user brings part of his/her body (for example, the auricular cartilage) into contact with the panel 20, the panel 20 generates a vibration sound to be transmitted to the user via the part of the body. That is, the panel 20 is vibrated with a frequency perceived as a vibration sound with respect to the object being in contact with the panel 20 corresponding to the deformation of the piezoelectric element 7. The panel 20 is curved corresponding to the expansion/contraction or bend of the piezoelectric element 7. The panel 20 is bent directly by the piezoelectric element 7. "The panel 20 is bent directly by the piezoelectric element" means a phenomenon different from a phenomenon, which is applied to conventional panel speakers, in which a specific region of the panel is excited by an inertial force of a piezoelectric actuator configured by arranging the piezoelectric element in a casing, and the panel is deformed. "The panel 20 is bent directly by the piezoelectric element" means that the panel is bent directly due to the expansion/contraction or bend (curve) of the piezoelectric element via the joining member, or via the joining member and a reinforcing member 31 described later.

For example, when the electric signal corresponding to a voice of a call partner or sound data such as a ring tone and music is applied to the piezoelectric element 7, the panel 20 generates the air conduction sound and the vibration sound corresponding to the electric signal. A sound signal output via the piezoelectric element 7 and the panel 20 may be based on sound data stored in a storage 9 described later. The sound signal output via the piezoelectric element 7 and the panel 20 may be based on sound data stored in an external server and the like and acquired by a communication unit 6 described later via a network.

In the present embodiment, a size of the panel 20 may be substantially the same as that of the ear of the user. The size of the panel 20 may be, as illustrated in FIG. 3, larger than that of the ear of the user. In this case, the user can bring substantially the entire outer periphery of the ear into contact with the panel 20 to listen to the sound. When the user listens to the sound in this way, an ambient sound (noise) is hardly transmitted to the external auditory meatus. In the present embodiment, at least a region of the panel 20 is vibrated, the region being larger than a region having a length in the longitudinal direction (or the lateral direction) corresponding to a distance between an inferior crus of antihelix (inferior crus antihelix) and an antitragus and a length in the lateral direction (or the longitudinal direction) corresponding to a distance between a tragus and an antihelix of a man. A region of the panel 20 may be vibrated, the region having the length in the longitudinal direction (or the lateral direction) corresponding to a distance between a portion of a helix near a superior crus of antihelix (superior crus antihelix) and a lobule and the length in the lateral direction (or the longitudinal direction) corresponding to a distance between the tragus and a portion of the helix near the antihelix. The region having the length and the width as described above may be a rectangular region, or may be an elliptical region of which major axis is the length in the longitudinal direction and a minor axis thereof is the length in the lateral direction. An ordinary size of a human ear can be found, for example, in the database of human body dimensions of Japanese (1992-1994) created by Research Institute of Human Engineering for Quality Life (HQL).

As illustrated in FIG. 4, not only the attachment region 20a to which the piezoelectric element 7 is attached, but also a region of the panel 20 spaced apart from the attachment region 20a is vibrated. The panel 20 includes a plurality of portions vibrated in a direction intersecting with a principal plane of the panel 20 in the vibrating region. At each of the portions, a value of the amplitude of the vibration is changed from positive to negative or vice versa with time. At each moment, the panel 20 is vibrated such that portions where the amplitude of the vibration is relatively large and portions where the amplitude of the vibration is relatively small are randomly or regularly distributed on substantially the entire panel 20. That is, vibration of a plurality of waves is detected over the entire area of the panel 20. When the voltage applied to the piezoelectric element 7 is ±15 V as described above, the vibration of the panel 20 described above is hardly attenuated even if the user presses the panel 20 against his/her body with a force of 5 N to 10 N, for example. Due to this, the user can listen to the vibration sound even when the user brings his/her ear into contact with a region on the panel 20 spaced apart from the attachment region 20a.

In the present embodiment, the display 2 is attached to the panel 20. Accordingly, rigidity of a lower part of the panel 20 (a side to which the display 2 is attached) is increased, and the vibration of the lower part of the panel 20 is smaller than that of an upper part of the panel 20 (a side to which the piezoelectric element 7 is attached). Due to this, leakage of the air conduction sound caused by the vibration of the panel 20 is reduced at the lower part of the panel 20. The upper part of the panel 20 is bent directly by the piezoelectric element 7, and the vibration of the lower part is attenuated as compared with that of the upper part. The panel 20 is bent by the piezoelectric element 7 so that a portion immediately above the piezoelectric element 7 protrudes the highest as compared with surroundings thereof in the long side direction of the piezoelectric element 7.

The mobile phone 1A can transmit the air conduction sound and the vibration sound via part of the user's body (for example, the auricular cartilage) through the vibration of the panel 20. Accordingly, when outputting a sound of which volume is comparable to that of a dynamic receiver, the mobile phone 1A can reduce the sound transmitted to the surroundings of the mobile phone 1A through the vibration of air as compared with that of an electronic device including only a dynamic speaker. Such a characteristic is preferable, for example, in a case of listening to a recorded message at a place where there are other people such as in a train.

The mobile phone 1A also transmits the vibration sound to the user through the vibration of the panel 20. Accordingly, even when wearing an earphone or a headphone, the user can bring the mobile phone 1A into contact therewith to listen to the vibration sound through the vibration of the panel 20 via the earphone or the headphone and part of the body.

The mobile phone 1A transmits the sound through the vibration of the panel 20. Accordingly, when the mobile phone 1A does not separately include the dynamic receiver, it is not necessary to form, in the housing 40, an opening (sound emitting port) for transmitting the sound emitted from the panel 20 to the outside. Due to this, in a case of making a waterproof structure, the structure can be simplified. When it is necessary to form the opening such as a sound emitting port of the dynamic speaker in the housing 40, the mobile phone 1A may employ a structure of blocking the opening with a member that passes gas but not liquid to make the waterproof structure. The member that passes gas but not liquid is, for example, GORE-TEX (registered trademark).

Figure 5:
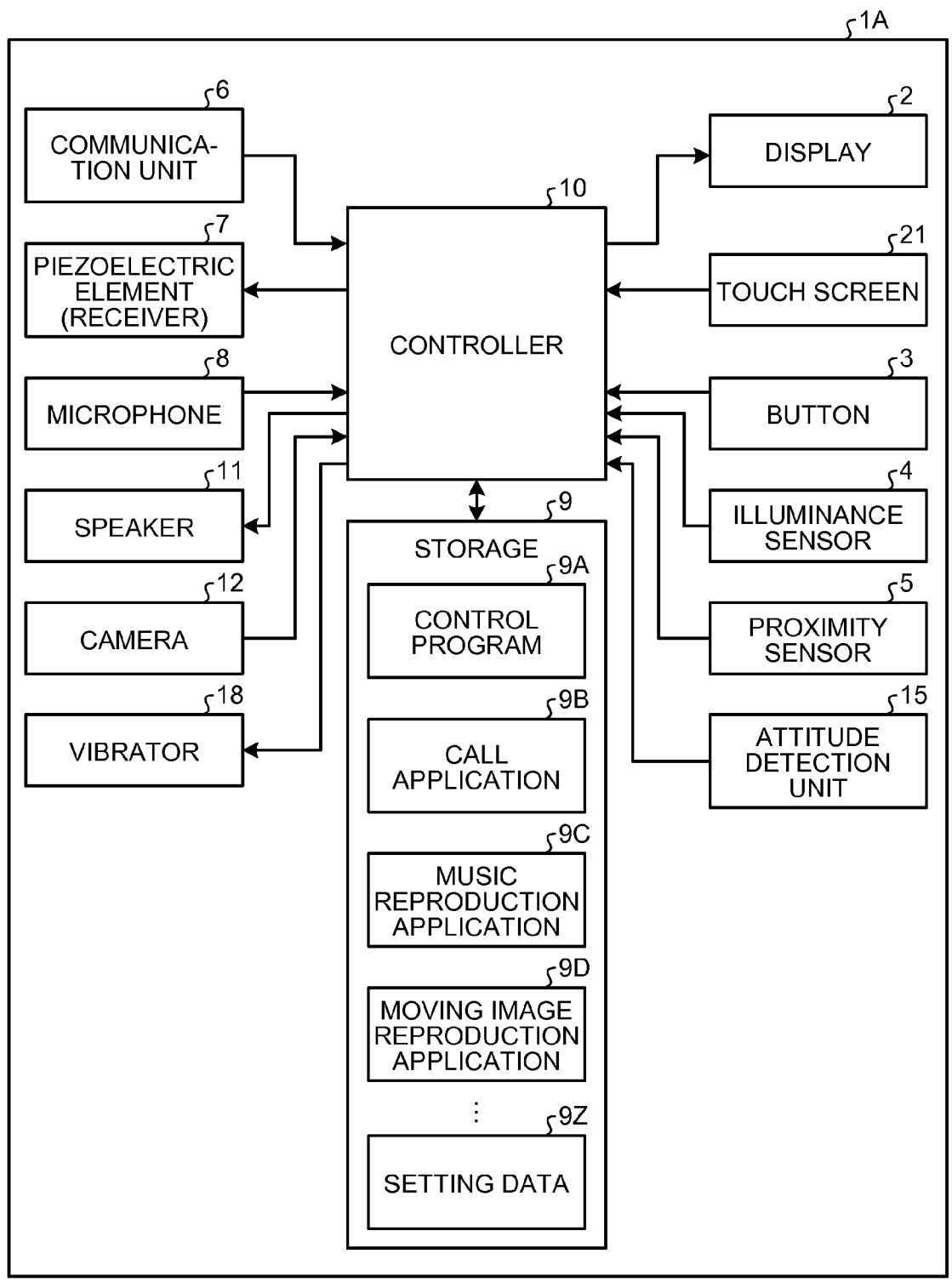
FIG. 5 is a block diagram of the mobile phone according to the embodiment.

The following describes a functional structure of the mobile phone 1A with reference to FIG. 5. FIG. 5 is a block diagram of the mobile phone 1A. As illustrated in FIG. 5, the mobile phone 1A includes the display 2, the button 3, the illuminance sensor 4, the proximity sensor 5, the communication unit 6, the piezoelectric element 7, the microphone 8, the storage 9, a controller 10, the speaker 11, the camera 12, an attitude detection unit 15, a vibrator 18, and the touch screen 21.

The communication unit 6 performs communication in a wireless manner. A communication system supported by the communication unit 6 is a wireless communication standard. Examples of the wireless communication standard include, but are not limited to, communication standards for cellular phone such as 2G, 3G, and 4G. Examples of the communication standard for cellular phone include, but are not limited to, long term evolution (LTE), wideband code division multiple access (W-CDMA), CDMA 2000, personal digital cellular (PDC), global system for mobile communications (GSM) (registered trademark), and personal handy-phone system (PHS). The examples of the wireless communication standard further include, but are not limited to, worldwide interoperability for microwave access (WiMAX), IEEE 802.11, Bluetooth (registered trademark), Infrared Data Association (IrDA), and near field communication (NFC). The communication unit 6 may support one or more of the communication standards described above.

The storage 9 stores therein a computer program and data. The storage 9 is also used as a working area for temporarily storing therein a processing result of the controller 10. The storage 9 may include any non-transitory storage medium such as a semiconductor storage medium and a magnetic storage medium. The storage 9 may include a plurality of types of storage media. The storage 9 may include a combination of a portable storage medium such as a memory card, an optical disc, or a magneto-optical disc and a reading device of the storage medium. The storage 9 may include a storage device that is used as a temporary storage region such as a random access memory (RAM).

The computer program stored in the storage 9 includes an application executed in the foreground or the background and a control program for assisting an operation of the application. The application causes, for example, the display 2 to display a screen, and causes the controller 10 to perform processing corresponding to a gesture detected by the touch screen 21. The control program is, for example, an operating system (OS). The application and the control program may be installed in the storage 9 via wireless communication with the communication unit 6 or a non-transitory storage medium.

The storage 9 stores therein, for example, a control program 9A, a call application 9B, a music reproduction application 9C, a moving image reproduction application 9D, and setting data 9Z. The call application 9B provides a call function for a call via wireless communication. The music reproduction application 9C provides a music reproduction function for reproducing sounds from music data. The moving image reproduction application 9D provides a moving image reproduction function for reproducing a moving image and sounds from moving image data. The setting data 9Z includes information about various settings related to an operation of the mobile phone 1A.

The control program 9A provides functions related to various control processes for operating the mobile phone 1A. The control program 9A causes a call to be performed, for example, by controlling the communication unit 6, the piezoelectric element 7, the microphone 8, and the like. The functions provided by the control program 9A include a function for performing control to guide the position of the ear being in contact with the panel 20 to a suitable position to hear the sound. The functions provided by the control program 9A may be used in combination with a function provided by another computer program such as the call application 9B in some cases.

The controller 10 is a processing unit. Examples of the processing unit include, but are not limited to, a central processing unit (CPU), a system-on-a-chip (SoC), a micro control unit (MCU), and a field-programmable gate array (FPGA). The controller 10 integrally controls the operation of the mobile phone 1A to implement various functions.

Specifically, the controller 10 executes a command included in the computer program stored in the storage 9 while referring to the data stored in the storage 9 as needed. The controller 10 then controls a functional unit corresponding to the data and the command to implement various functions. Examples of the functional unit include, but are not limited to, the display 2, the communication unit 6, the piezoelectric element 7, the microphone 8, the speaker 11, and the vibrator 18. The controller 10 may change the control depending on a detection result of the detection unit. Examples of the detection unit include, but are not limited to, the button 3, the illuminance sensor 4, the proximity sensor 5, the camera 12, the attitude detection unit 15, and the touch screen 21.

The controller 10 performs, for example, control for guiding, to a suitable position, the position of the ear being in contact with the panel 20 to hear the sound by executing the control program 9A.

The attitude detection unit 15 detects an attitude of the mobile phone 1A. The attitude detection unit 15 includes at least one of an acceleration sensor, an azimuth sensor, and a gyroscope to detect the attitude. The vibrator 18 vibrates part of or the entire mobile phone 1A. The vibrator 18 includes, for example, a piezoelectric element or an eccentric motor to generate the vibration. The vibration generated by the vibrator 18 is used for notifying the user of various events such as an incoming call, not for transmitting the sound.

Part of or the entire computer program and data stored in the storage 9 in FIG. 5 may be downloaded from another device via wireless communication with the communication unit 6. Part of or the entire computer program and data stored in the storage 9 in FIG. 5 may be stored in a non-transitory storage medium that can be read by the reading device included in the storage 9. Examples of the non-transitory storage medium include, but are not limited to, an optical disc such as a CD (registered trademark), a DVD (registered trademark), and a Blu-ray (registered trademark), a magneto-optical disc, a magnetic storage medium, a memory card, and a solid-state storage medium.

The configuration of the mobile phone 1A illustrated in FIG. 5 is exemplary only, and may be appropriately modified within a range that does not change the gist of the present invention. For example, the mobile phone 1A may include buttons of ten-key layout, QWERTY layout, or the like as buttons for operation.

Figure 6A:
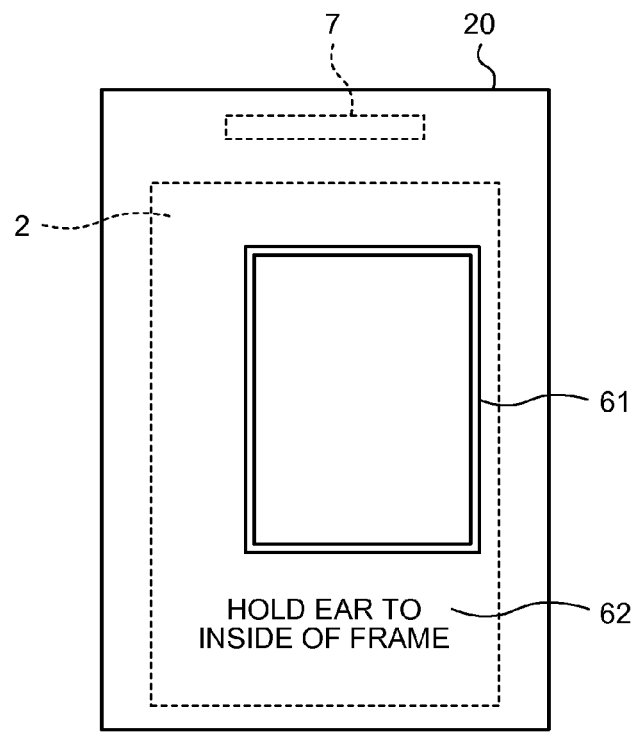
FIG. 6A is a diagram for explaining guidance that is performed before contact.
Figure 6B:
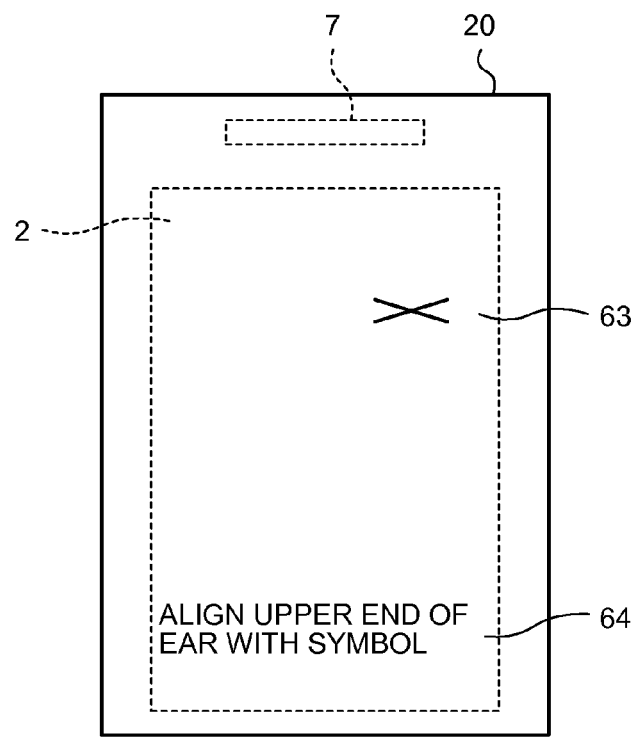
FIG. 6B is a diagram for explaining guidance that is performed before contact.
Figure 7A:
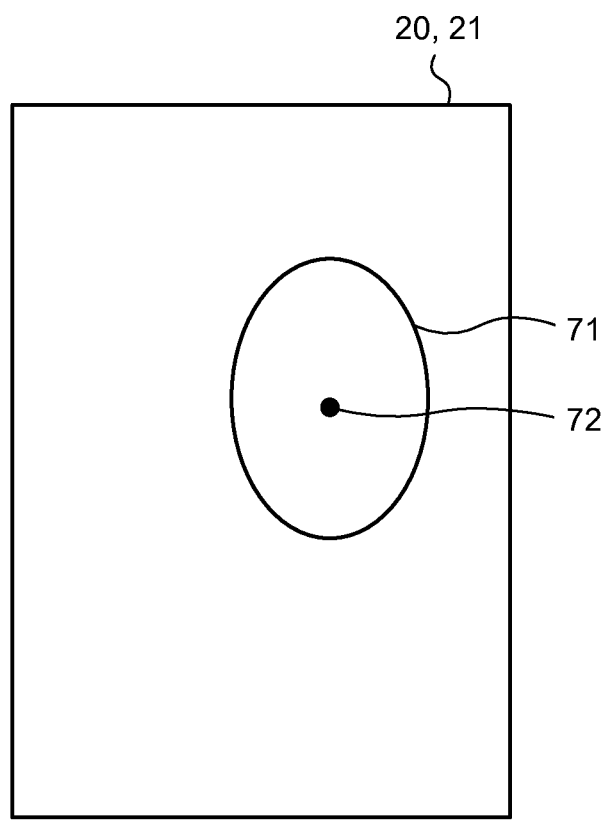
FIG. 7A is a diagram for explaining detection of a position of an ear.
Figure 7B:
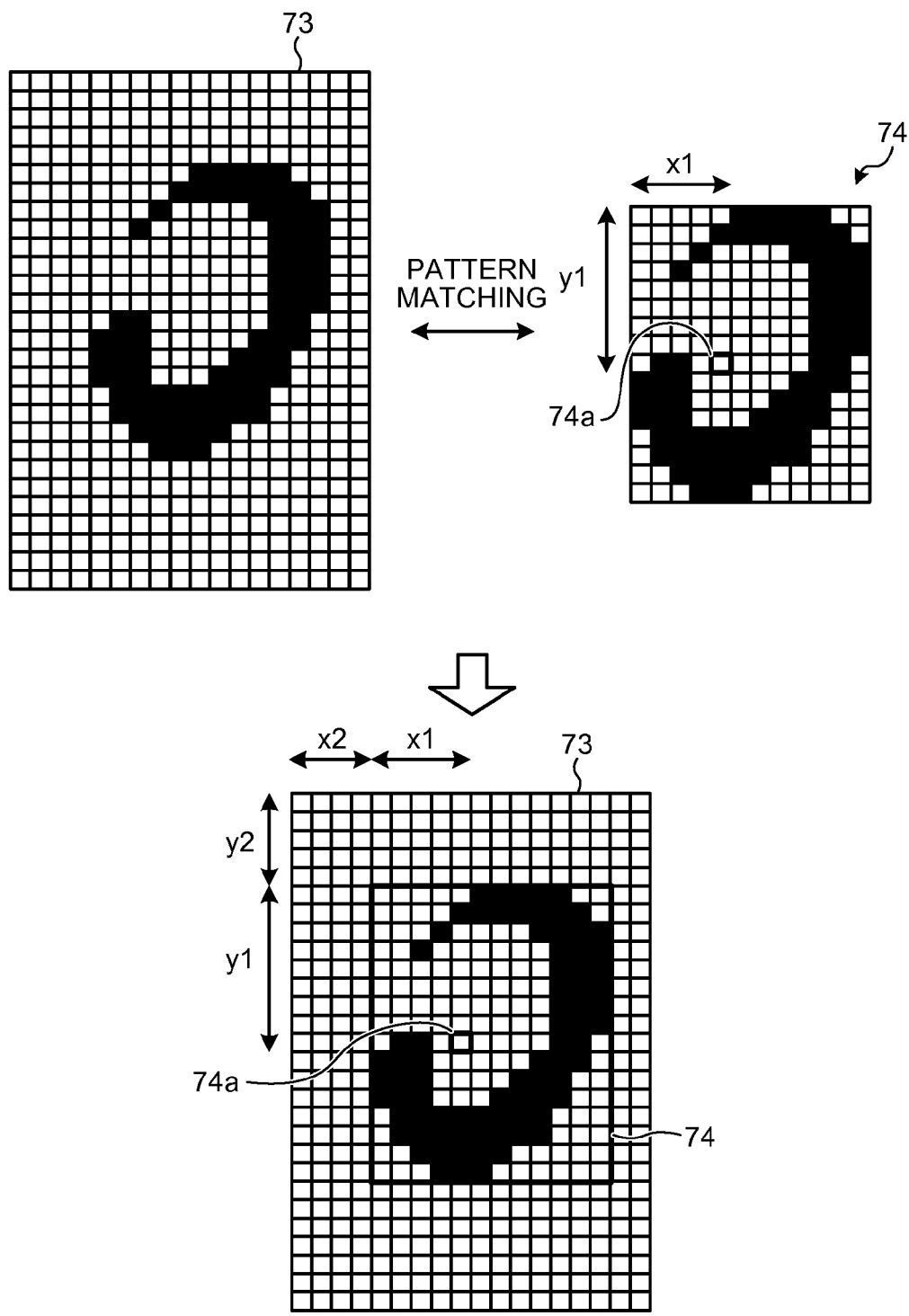
FIG. 7B is a diagram for explaining the detection of the position of the ear.
Figure 7C:
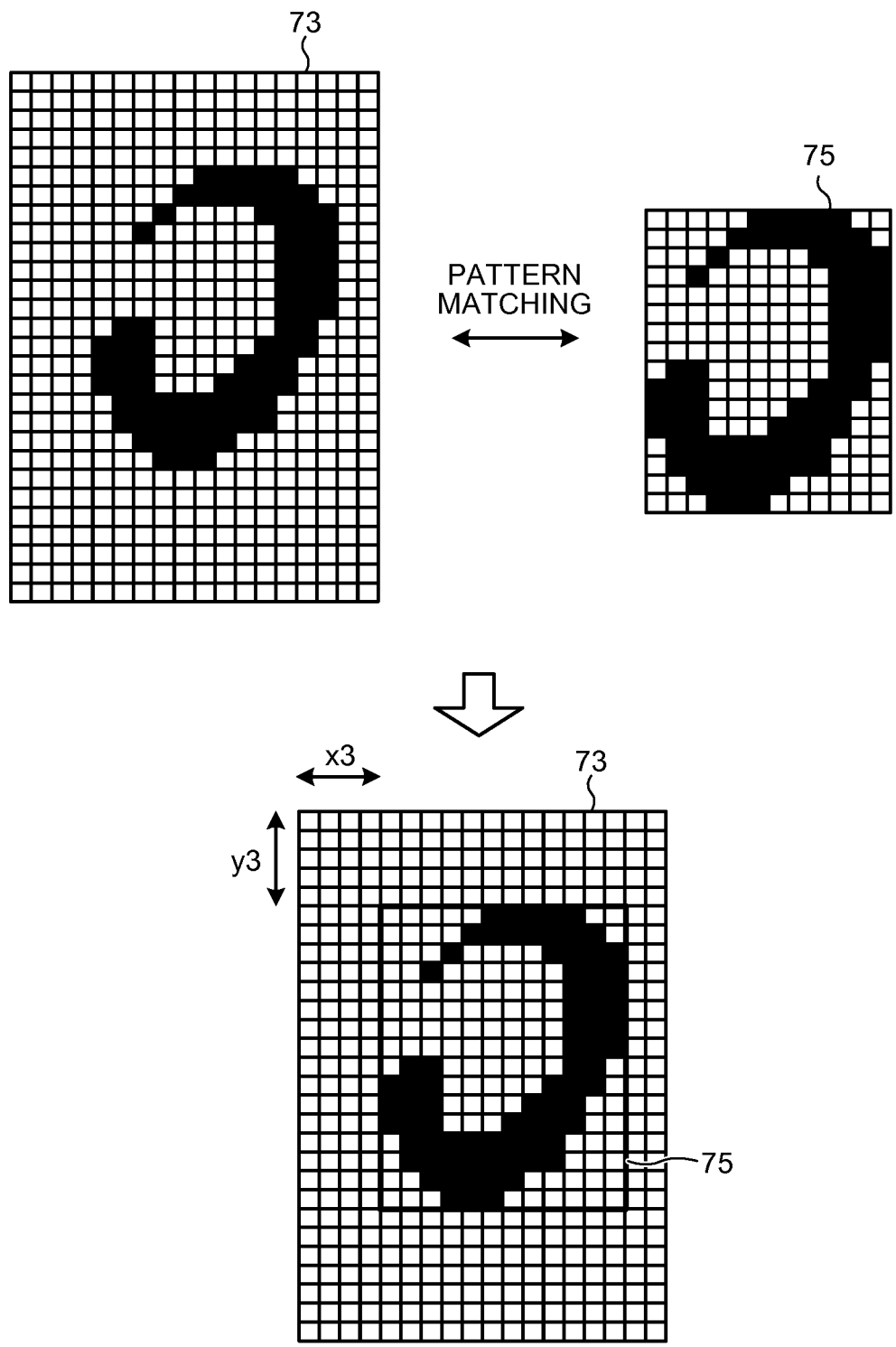
FIG. 7C is a diagram for explaining the detection of the position of the ear.
Figure 8:
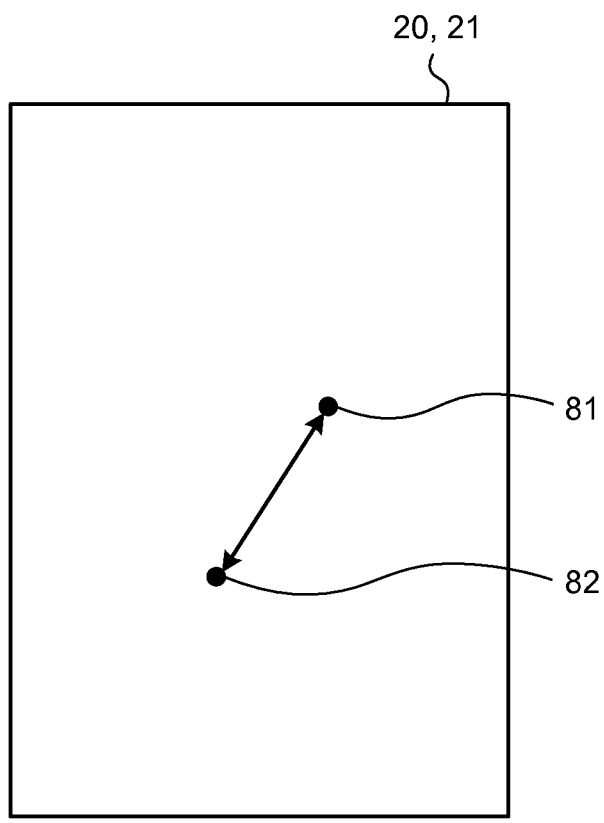
FIG. 8 is a diagram for explaining guidance that is performed after contact.

With reference to FIG. 6A to FIG. 9, the following describes the control for guiding, to a standard position, the position of the ear being in contact with the panel 20 to hear the sound. The standard position is a position on the panel 20 at which the user can preferably hear the vibration sound. FIG. 6A to FIG. 6C are diagrams for explaining the guidance that is performed before the ear comes into contact with the panel 20. FIG. 7A to FIG. 7C are diagrams for explaining detection of the position of the ear being in contact with the panel 20. FIG. 8 is a diagram for explaining the guidance that is performed after the ear comes into contact with the panel 20. FIG. 9A and FIG. 9B are diagrams illustrating an example of changing the control.

The control for guiding the position of the ear to the standard position includes the control that is performed before the ear comes into contact with the panel 20 and the control that is performed after the ear comes into contact with the panel 20. First, the following describes the control that is performed before the ear comes into contact with the panel 20.

At the stage before the ear comes into contact with the panel 20, as illustrated in FIG. 6A to FIG. 6C, the mobile phone 1A causes the display 2 to display information for guiding the ear coming into contact with the panel 20 to the standard position. At this stage, the mobile phone 1A may or may not cause the panel 20 to be vibrated. That is, the mobile phone 1A may start to apply an electric signal to the piezoelectric element 7 before the ear comes into contact with the panel 20, or may start to apply the electric signal to the piezoelectric element 7 after the ear comes into contact with the panel 20.

To guide the ear coming into contact with the panel 20 to the standard position, the mobile phone 1A may display, on the display 2, a frame 61 the size of which is substantially the same as the ear, and a message 62 for prompting the user to bring the ear into contact with the inside of the frame 61. Alternatively, as illustrated in FIG. 6B and FIG. 6C, the mobile phone 1A may display, on the display 2, a symbol 63 or 65 corresponding to a certain part of the ear, and a message 64 or 66 for prompting the user to align the part with the symbol 63 or 65. The part of the ear to be aligned with the symbol may be a part the position of which is easily aligned with the symbol by the user, such as an upper end of the ear. Alternatively, it may be a part with which the panel 20 easily comes into contact, such as a tragus.

In this way, by causing the display 2 to display the information for guiding the ear to the standard position on the display 2, the user can easily grasp a suitable position on the panel 20 with which the ear comes into contact to hear the sound. The information for guiding the ear to the standard position is not limited to the examples illustrated in FIG. 6A to FIG. 6C, and may be any information through which the user can understand the suitable position on the panel 20 with which the ear comes into contact. As the information for guiding the ear to the standard position, the mobile phone 1A may display the shape of the ear as illustrated in FIG. 3 on the display 2, for example.

In this embodiment, the mobile phone 1A learns the standard position based on the position of the ear when the user is using the mobile phone 1A. When the user hears the vibration sound by bringing his/her ear into contact with the panel 20, it is considered that the user adjusts the position of the ear on the panel 20 so that the sound can be easily heard, while hearing the sound. So the mobile phone 1A tracks the position of the ear while the ear is in contact with the panel 20, and determines the standard position based on a tracking result. For example, when the ear stays at the same position for more than a certain time period while being in contact with the panel 20 during when the electric signal is applied to the piezoelectric element 7, the mobile phone 1A determines the position as the standard position. The position may be a specific position in a region in which the contact of the ear is detected. When the region in which the contact of the ear is detected is not changed for a certain time period while the electric signal is applied to the piezoelectric element 7, the mobile phone 1A may determine the region as the standard region. The mobile phone 1A may determine the standard position based on information indicating a specific region of an image (described later) obtained from the detection result of the touch screen 21 when an object comes into contact therewith, for example. The determined standard position is stored in the setting data 9Z.

To reduce the load on the mobile phone 1A, the determination of the standard position may be performed only in a predetermined period after the mobile phone 1A is started to be used, or may be periodically performed at predetermined intervals. Alternatively, the mobile phone 1A may not determine the standard position in usual use, and may determine the standard position by performing a calibration process when the mobile phone 1A is started to be used or when instructed by the user. In the calibration process, the mobile phone 1A displays, on the display 2, a message for prompting the user to bring his/her ear into contact with the panel 20 and stop movement of the ear at the position where the sound can be easily heard while vibrating the panel 20 by applying the electric signal to the piezoelectric element 7, and starts to determine the standard position. Alternatively, the standard position may be set in advance at a fixed position where most people can easily hear the sound.

The mobile phone 1A detects the position of the ear being in contact with the panel 20 by using the touch screen 21. For example, as illustrated in FIG. 7A, the mobile phone 1A detects a position 72 determined based on a region 71 in which the touch screen 21 detects the contact of the ear as the position of the ear. The position 72 is, for example, the center (the center of gravity) of the region 71. The position 72 may be any of the apexes of a minimum rectangle including the region 71. The position 72 may be a position corresponding to a predetermined part of the ear. In this case, the position 72 is calculated using a relative positional relation with respect to the region 71 based on information about a general position of the part in the ear.

According to this system, the position of the ear being in contact with the panel 20 can be detected without performing complicated arithmetic operation. This system can also be applied to a case in which the number of points is small at which the touch screen 21 can detect the contact with the panel 20 at the same time.

Alternatively, as illustrated in FIG. 7B, the mobile phone 1A detects the position of the ear by pattern matching between a sample 74 prepared in advance and an image 73 obtained based on a detection result of the touch screen 21 being in contact with the object. The image 73 is obtained by dividing a detection region of the touch screen 21 in a grid pattern and converting a detection state of the contact of the object in each of the divided regions into a state of a corresponding pixel. In a case in which a value detected by the touch screen 21 in each region varies, for example, depending on a distance between the touch screen 21 and the object or the pressing force of the object against the touch screen 21, the image 73 may be a multi-gradation image.

The sample 74 is an image supposed to be obtained, when the ear is in contact with the touch screen 21, in the same manner as the image 73 in a region being in contact with the ear. The sample 74 may be an image supposed to be obtained when the ear of the user of the mobile phone 1A is in contact with the touch screen 21, or may be an image supposed to be obtained when the ear of an ordinary person is in contact therewith. A plurality of samples 74 may be prepared such as an image of a right ear and an image of a left ear.

The sample 74 includes a standard position 74a corresponding to a predetermined part of the ear. The standard position 74a is positioned at (x1, y1) using the upper left of the sample 74 as a reference. The standard position 74a may be set based on information about the position of the same part in an ordinary person. In a case in which the sample 74 is an image actually obtained when the ear of the user of the mobile phone 1A is in contact with the touch screen 21, the standard position 74a may be set by analyzing the image.

When the image 73 is obtained, the mobile phone 1A obtains, by pattern matching, a relative position between the image 73 and the sample 74 when both of them optimally match with each other. When it is determined that the image 73 does not match with the sample 74 by pattern matching (for example, when a matching degree is lower than a threshold), the mobile phone 1A may determine that the contact of the ear is not detected. When the relative position is obtained, the mobile phone 1A calculates the position of the ear based on the relative position and the standard position 74a. In a case of the example in FIG. 7B, the image 73 optimally matches with the sample 74 when the sample 74 is shifted in the X-axis direction by x2 and in the Y-axis direction by y2, using the upper left of the image 73 as a reference. In this case, the position of the ear is calculated as follows: (x1+x2, y1+y2).

This system enables the position of the ear being in contact with the panel 20 to be detected with accuracy. This system also enables to determine, by matching with the sample, whether the object being in contact with the panel 20 is the ear, or whether the object being in contact with the panel 20 is an ear of a person registered in advance. This system also enables to detect detailed information about the contact of the ear such as an orientation and an inclination of the ear.

When the position of the ear is detected by pattern matching, the sample does not need to include the standard position. In the example illustrated in FIG. 7C, the image 73 is pattern-matched with a sample 75 not including the standard position. In a case of the example in FIG. 7C, the image 73 optimally matches with the sample 75 when the sample 75 is shifted in the X-axis direction by x3 and in the Y-axis direction by y3, using the upper left of the image 73 as a reference. In this case, for example, the position of the ear is calculated as follows: (x3, y3).

This system facilitates creation of the sample because the standard position is not included. For example, in a case in which a moving direction and a movement amount of the position of the ear are required and the position of a certain part of the ear does not need to be specified, necessary information can be obtained through this system without setting the standard position in the sample.

The system for detecting the position of the ear being in contact with the panel 20 using the touch screen 21 is not limited to the system described above. Alternatively, another system may be employed.

The mobile phone 1A may employ pattern matching and thereby guide the ear so that an inclination of the ear that is in contact with the panel 20 becomes close to a preferred inclination registered in advance.

The setting data 9Z stores information indicating the standard position that is determined based on the position of the ear on the panel 20 detected with any of the above systems or another system. The mobile phone 1A adjusts the position at which the information for guiding the ear to the standard position is displayed depending upon the standard based on which the position of the ear is detected. For example, it is assumed that the position of the ear is detected with pattern matching using a sample including the position corresponding to the tragus of the ear as the standard position. In this case, the frame 61 illustrated in FIG. 6A is displayed so as to surround a range with which the ear of the user or an ordinary person is in contact when the tragus is positioned at the standard position, the symbol 63 illustrated in FIG. 6B is displayed at an upper end of the range, and the symbol 65 illustrated in FIG. 6C is displayed at the standard position.

Then the following describes control that is performed after the ear comes into contact with the panel 20 to guide the position of the ear to the standard position. When the touch screen 21 detects that the ear is in contact with the panel 20, the mobile phone 1A detects the position at which the ear is in contact with the panel 20 with any of the above systems or another system. Subsequently, the mobile phone 1A performs control for bringing the position of the ear close to the standard position.

When the ear is in contact with the panel 20, the display 2 is positioned at a side surface of a face. In this case, the user cannot easily view the information displayed on the display 2. Accordingly, the mobile phone 1A controls the electric signal to be applied to the piezoelectric element 7 to guide the position of the ear to be close to the standard position.

For example, as illustrated in FIG. 8, it is assumed that the standard position is a position 81 on the panel 20 and the position of the ear detected by using the touch screen 21 is a position 82. In this case, as illustrated in FIG. 9A, the mobile phone 1A controls the electric signal to be applied to the piezoelectric element 7 so that the sound volume decreases as a distance between the position 81 and the position 82 increases. That is, the mobile phone 1A changes the control of the piezoelectric element 7 so that the sound volume decreases as the distance between the position 81 and the position 82 increases.

With such control, the user can easily determine whether the position of the ear comes close to or moves away from the standard position by moving the mobile phone 1A while keeping the ear in contact with the panel 20, and can bring the position of the ear close to the standard position. In addition, with such control, the sound is output with a sound volume closer to an original volume as the position of the ear comes close to the standard position, so that the sound volume is not abruptly changed during when the position of the ear comes closer to the standard position. Accordingly, it is possible to provide natural and intuitive operation feeling to the user.

FIG. 9A illustrates an example of changing the control of the piezoelectric element 7 in accordance with the distance between the position 81 and the position 82. Alternatively, the mobile phone 1A may change the control of the piezoelectric element 7 by adding a direction of one position viewed from another position as a condition. FIG. 9A illustrates an example of changing the sound volume of the output sound in accordance with the distance between the position 81 and the position 82. Alternatively, the mobile phone 1A may change tone of the output sound in accordance with the distance between the position 81 and the position 82. For example, as illustrated in FIG. 9B, the mobile phone 1A may change a level of a high-pitched part of the output sound in accordance with the distance between the position 81 and the position 82 in the X-axis direction, and may change a level of a low-pitched part of the output sound in accordance with the distance between the position 81 and the position 82 in the Y-axis direction. With such control, the user can easily grasp in which direction the mobile phone 1A should be moved to bring the position of the ear close to the standard position.

Figure 10:
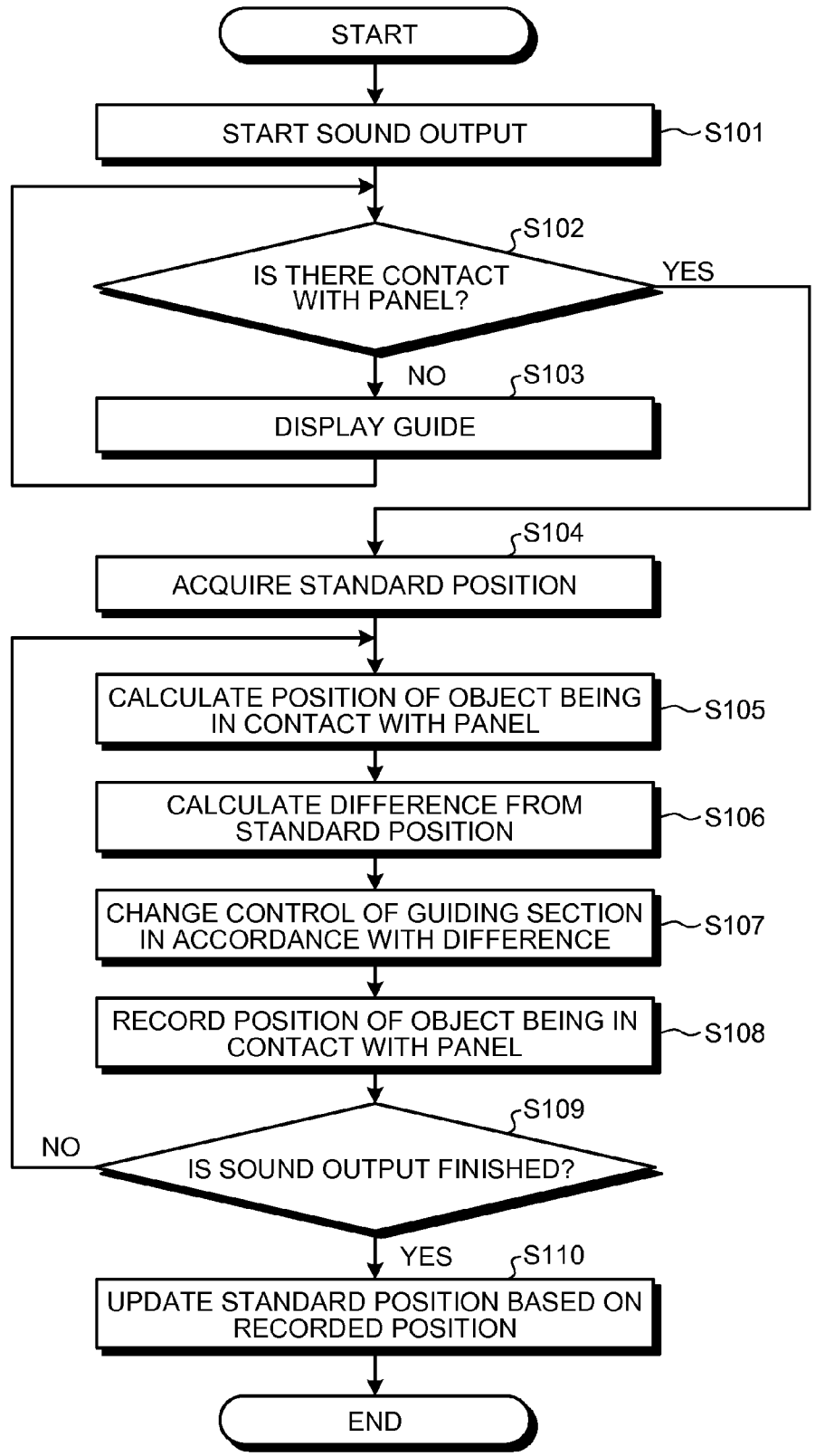
FIG. 10 is a flowchart illustrating a processing procedure of control for guiding the position of the ear to a standard position.
Figure 11:
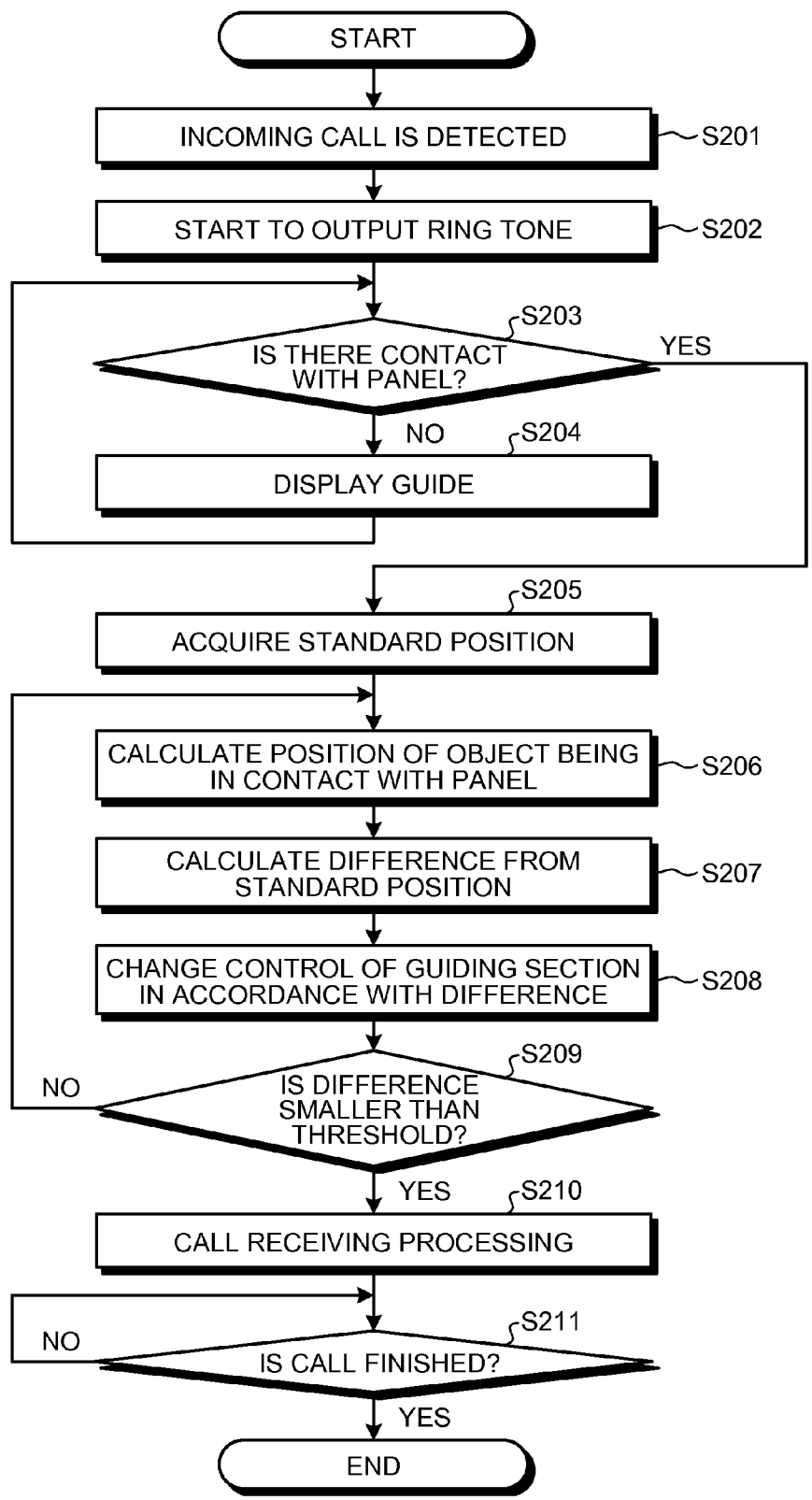
FIG. 11 is a flowchart illustrating a processing procedure of control when an incoming call is detected.

With reference to FIG. 10 and FIG. 11, the following describes a processing procedure of control for guiding, to the standard position, the position of the ear being in contact with the panel 20 to hear the sound. FIG. 10 is a flowchart illustrating the processing procedure of the control for guiding the position of the ear to the standard position. FIG. 11 is a flowchart illustrating a processing procedure of control when an incoming call is detected. The processing procedures illustrated in FIG. 10 and FIG. 11 are performed when the controller 10 executes the control program 9A.

When the sound output is started by vibrating the panel 20, or when preparation is made for starting the sound output by vibrating the panel 20 (Step S101), the controller 10 determines whether there is an object being in contact with the panel 20 based on the detection result of the touch screen 21 (Step S102). When there is no object being in contact with the panel 20 (No at Step S102), as illustrated in FIG. 6A to FIG. 6C, the controller 10 causes the display 2 to display a guide indicating the position with which the ear is brought into contact (Step S103). The guide is kept continuously displayed until the object being in contact with the panel 20 is detected.

When there is the object being in contact with the panel 20 (Yes at Step S102), the controller 10 acquires information indicating the standard position from the setting data 9Z stored in the storage 9 (Step S104).

When there is an object being in contact with the panel 20, the controller 10 may turn off the display 2 to reduce power consumption. In a case in which the control for turning off the display 2 by the controller 10 is implemented in another processing procedure when the proximity sensor 5 detects that a face approaches the display 2, the control for turning off the display 2 does not need to be performed in the present procedure. Generally, in mobile phones such as a smartphone, when the proximity sensor 5 detects a face approaching the panel 20, control is performed for disabling the touch screen 21 to prevent a misoperation in addition to control for turning off the display 2. In the present embodiment, the position of the ear being in contact with the panel 20 is detected using the touch screen 21, so that the touch screen 21 is kept operative even when the proximity sensor 5 detects that the face approaches the panel 20.

The controller 10 then calculates the position of the object being in contact with the panel 20 based on the detection result of the touch screen 21 (Step S105). Subsequently, the controller 10 calculates a difference between the calculated position and the standard position (Step S106). The calculated difference may include only a value related to the distance, or may include a value related to the distance and a value related to the direction.

The controller 10 then changes control of a guiding section in accordance with the calculated difference (Step S107). In this embodiment, the guiding section is the piezoelectric element 7, and the control of the guiding section is changed as illustrated in FIG. 9A or FIG. 9B, for example. Subsequently, the controller 10 records the position of the object being in contact with the panel 20 (Step S108), and determines whether to finish the sound output from the panel 20 (Step S109). Examples of the case of finishing the sound output include, but are not limited to, a case in which an operation for finishing the sound output by the user is detected and a case in which processing for outputting the sound is completed, such as a telephone call, music reproduction, and moving image reproduction.

When the sound output is not finished (No at Step S109), the controller 10 performs Step S105 and following processes again. When the sound output is finished (Yes at Step S109), the controller 10 calculates the standard position based on the recorded position, and updates the standard position stored in the setting data 9Z as needed (Step S110). Examples of a case in which the standard position stored in the setting data 9Z needs to be updated include, but are not limited to, a case in which the ear stays at a position other than the standard position for more than a certain period of time, or a case in which a time period longer than a certain period of time has elapsed after the last update of the standard position.

To reduce power consumption, the controller 10 may suspend a loop from Step S105 to Step S109 to perform Step S110 when the difference becomes smaller than a threshold. When a certain period of time has elapsed after the object being in contact with the panel 20 is detected, the controller 10 may suspend the loop from Step S105 to Step S109 to perform Step S110. To suspend the loop, the controller 10 may disable the touch screen 21 to further reduce the power consumption. Even when the loop is suspended, the sound output via the panel 20 is continued.

The controller 10 may start processing related to the sound output when the difference between the position of the ear and the standard position becomes smaller than the threshold. For example, the controller 10 may start to guide the position of the ear when an incoming call is detected, and may automatically start call receiving processing when the difference between the position of the ear and the standard position becomes smaller than the threshold. The following describes a processing procedure in such a case.

As illustrated in FIG. 11, when an incoming call is detected (Step S201), the controller 10 starts to output a ring tone to notify the user of the incoming call (Step S202). At this stage, the ring tone may be output via the panel 20, via the speaker 11, or via both of them. To notify the user of the incoming call, the controller 10 may use vibration of the vibrator 18, blinking of a lamp, or the like at the same time.

The controller 10 then determines whether there is an object being in contact with the panel 20 based on the detection result of the touch screen 21 (Step S203). When there is no object being in contact with the panel 20 (No at Step S203), as illustrated in FIG. 6A to FIG. 6C, the controller 10 causes the display 2 to display the guide indicating the position with which the ear is brought into contact (Step S204). The guide is kept continuously displayed until the object being in contact with the panel 20 is detected.

When there is the object being in contact with the panel 20 (Yes at Step S203), the controller 10 acquires information indicating the standard position from the setting data 9Z stored in the storage 9 (Step S205). At this stage, the controller 10 outputs the ring tone via at least the panel 20. When the ring tone is output via the speaker 11, the controller 10 may stop the output of the ring tone via the speaker 11 at this stage. The control for turning off the display 2 and disabling the touch screen 21 is the same as in FIG. 10 when there is the object being in contact with the panel 20.

The controller 10 then calculates a position of the object being in contact with the panel 20 based on the detection result of the touch screen 21 (Step S206). Subsequently, the controller 10 calculates a difference between the calculated position and the standard position (Step S207). The calculated difference may include only a value related to the distance, or may include a value related to the distance and a value related to the direction.

The controller 10 then changes the control of the guiding section in accordance with the calculated difference (Step S208). The control of the guiding section is similar to the control described above. Subsequently, the controller 10 determines whether the calculated difference is smaller than the threshold (Step S209). When the difference is not smaller than the threshold (No at Step S209), Step S206 and following processes are performed again.

When the difference is smaller than the threshold, that is, the user can hear the sound clearly (Yes at Step S209), the controller 10 performs call receiving processing (Step S210). The call receiving processing is processing to start a call by replying a signal indicating off-hook. When the call is started, a voice of a person on the other end is transmitted to the user via the panel 20. By automatically performing the call receiving processing at such timing, the mobile phone 1A can start the call in a state in which the user can easily hear the voice of the person on the other end without performing an extra operation. The call is continued until an operation of disconnecting the call and the like are performed on either end (Step S211).

Second Embodiment

Figure 12:
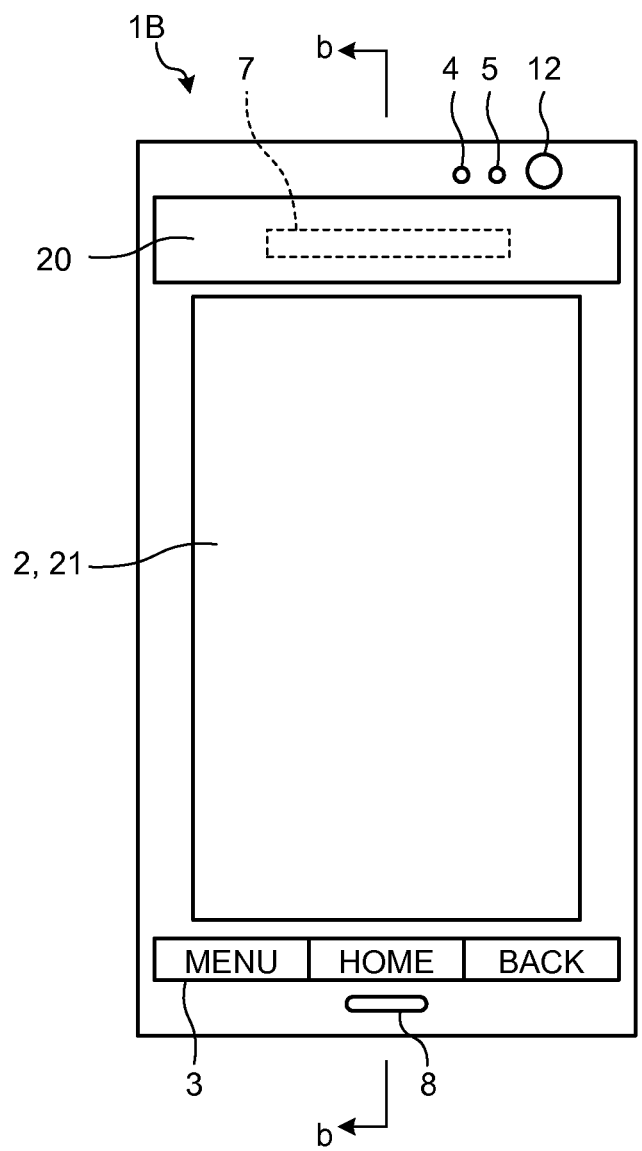
FIG. 12 is a front view of a mobile phone according to another embodiment.
Figure 13:
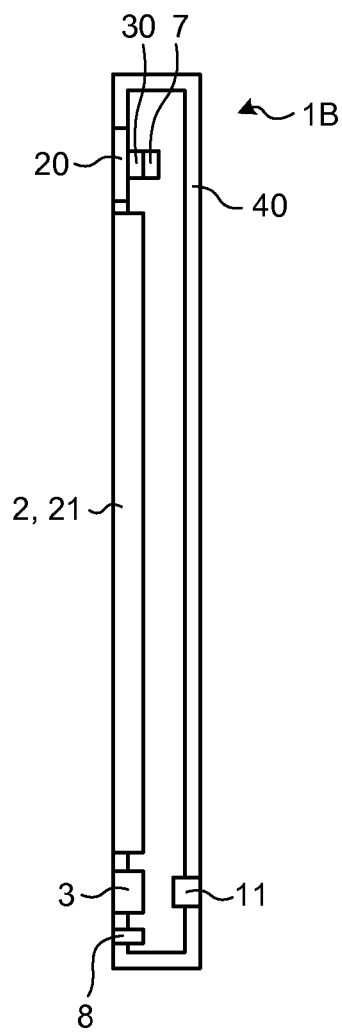
FIG. 13 is a cross-sectional view of the mobile phone according to another embodiment.

In the above embodiment, described is an example in which the touch screen 21 is arranged on substantially the entire surface of the panel 20. Alternatively, the touch screen 21 may be arranged so as not to be overlapped with the panel 20. FIG. 12 is a front view of a mobile phone 1B of which touch screen 21 is arranged so as not to be overlapped with the panel 20. FIG. 13 is a cross-sectional view schematically illustrating a cross-section along b-b line of the mobile phone 1B.

As illustrated in FIG. 12 and FIG. 13, the display 2 of the mobile phone 1B is arranged side by side with the panel 20 to be flush therewith, not inside the panel 20. The touch screen 21 is arranged to cover substantially the entire front surface of the display 2. That is, the touch screen 21 and the display 2 configure what is called a touch panel (touch screen display).

The piezoelectric element 7 is attached to substantially the center of the back surface of the panel 20 with the joining member 30. When the electric signal is applied to the piezoelectric element 7, the panel 20 is vibrated corresponding to deformation (expansion/contraction or bend) of the piezoelectric element 7, and generates an air conduction sound and a vibration sound transmitted via part of a human body (for example, the auricular cartilage) being in contact with the panel 20. By arranging the piezoelectric element 7 at the center of the panel 20, the vibration of the piezoelectric element 7 is uniformly transmitted to the entire panel 20, and the quality of the air conduction sound and the vibration sound is improved.

Although the touch screen 21 is not arranged on the front surface of the panel 20, the panel 20 is arranged near the display 2 on which the touch screen 21 is arranged.

Figure 14:
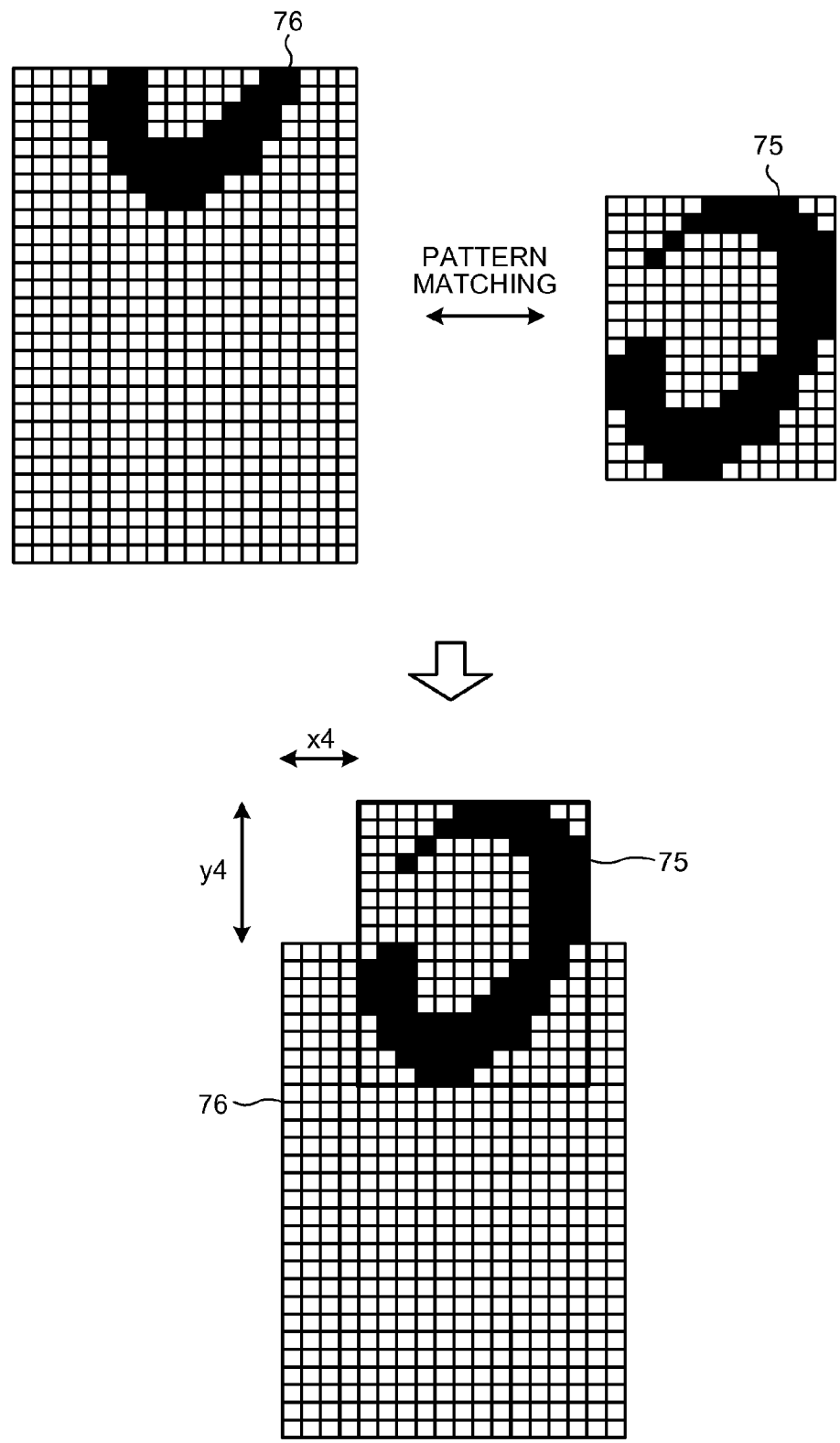
FIG. 14 is a diagram for explaining the detection of the position of the ear.

When the user of the mobile phone 1B having such configuration brings his/her ear into contact with the panel 20 to listen to the vibration sound, part of his/her ear comes into contact with the touch screen 21 because the panel 20 is arranged near the touch screen 21. Accordingly, an image 76 as illustrated in FIG. 14 can be obtained by dividing the detection region of the touch screen 21 in a grid pattern and converting a detection state of the contact of the ear in each of the divided regions into a state of a corresponding pixel.

When the image 76 is obtained, the mobile phone 1B obtains, by pattern matching, a relative position between the image 76 and the sample 75 when both of them optimally match with each other. In a case of the example in FIG. 14, the image 76 optimally matches with the sample 75 when the sample 75 is shifted in the X-axis direction by x4 and in the Y-axis direction by −y4, using the upper left of the image 76 as a reference. In this case, the position of the ear is calculated as follows: (x4, −y4). The mobile phone 1B can also detect the position of the ear using the sample 74 including the standard position 74a.

As described above, even when the touch screen 21 is arranged so as not to be overlapped with the panel 20, the mobile phone 1B can detect the position of the ear being in contact with the panel 20 by using the touch screen 21. Accordingly, similarly to the mobile phone 1A, the mobile phone 1B can perform the control for guiding the position of the ear to the standard position.

Figure 15:
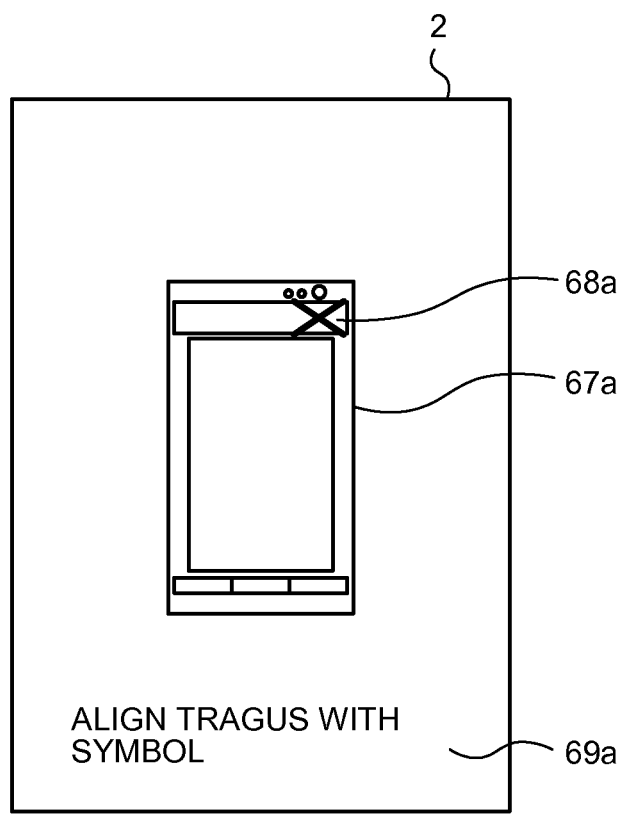
FIG. 15 is a diagram for explaining guidance that is performed before contact.

However, in the mobile phone 1B, when the display 2 displays the information for guiding the ear coming into contact with the panel 20 to the standard position, the position where the information is to be displayed may be the outside of the display region of the display 2. Then, as illustrated in FIG. 15, the mobile phone 1B displays the entire view 67a of the mobile phone 1B and a message 69a on the display 2, and arranges a symbol 68a on the entire view 67a.

Third Embodiment

Figure 16:
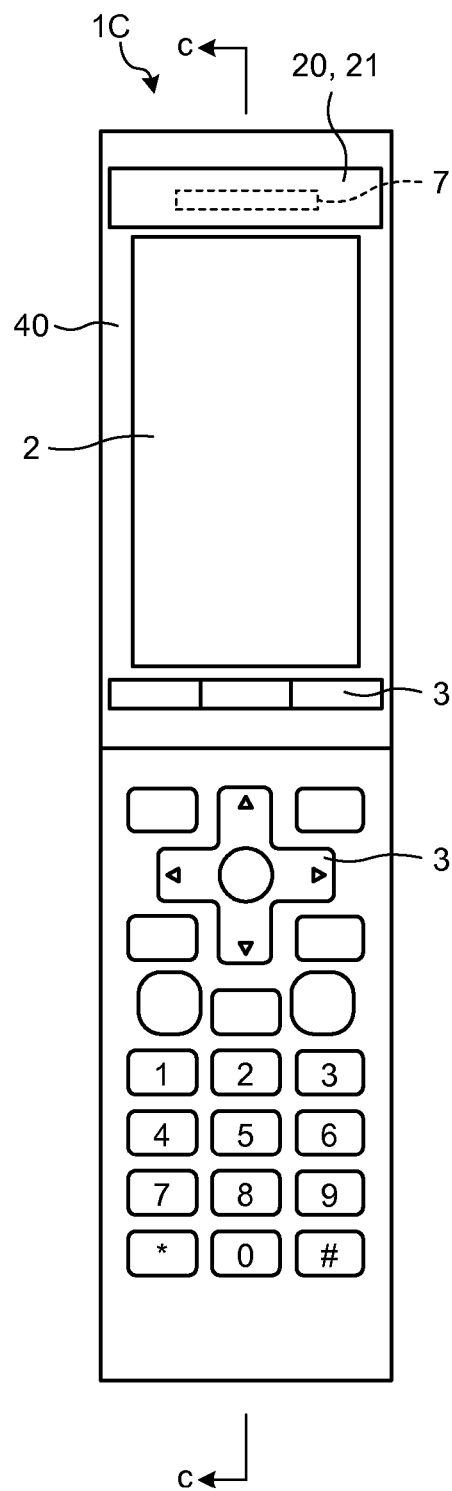
FIG. 16 is a front view of a mobile phone according to another embodiment.
Figure 17:
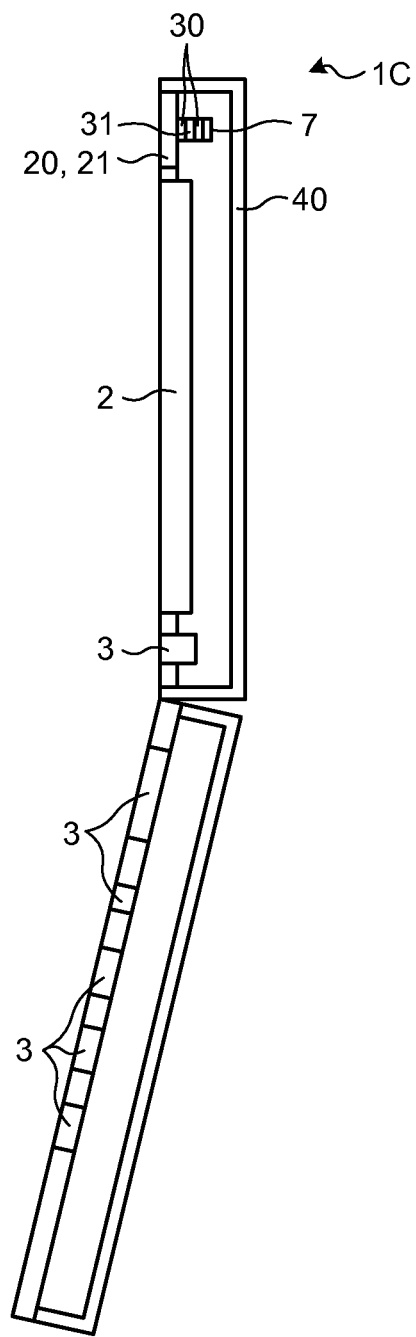
FIG. 17 is a cross-sectional view of the mobile phone according to another embodiment.

In the above embodiment, described is an example in which at least part of the touch screen 21 is arranged to be overlapped with the display 2. Alternatively, the touch screen 21 may be arranged so as not to be overlapped with the display 2. FIG. 16 is a front view of a mobile phone 1C of which touch screen 21 is arranged so as not to be overlapped with the display 2. FIG. 17 is a cross-sectional view schematically illustrating a cross-section along c-c line of the mobile phone 1C.

As illustrated in FIG. 16 and FIG. 17, the display 2 of the mobile phone 1C is arranged side by side with the panel 20 to be flush therewith, not inside the panel 20.

The piezoelectric element 7 is attached to substantially the center of the back surface of the panel 20 with the joining member 30. The reinforcing member 31 is arranged between the panel 20 and the piezoelectric element 7. That is, in the mobile phone 1C, the piezoelectric element 7 is bonded to the reinforcing member 31 with the joining member 30, and the reinforcing member 31 is bonded to the panel 20 with the joining member 30.

The reinforcing member 31 is an elastic member made of rubber or silicon, for example. The reinforcing member 31 may be, for example, a metal plate made of aluminum and the like having a certain degree of elasticity. The reinforcing member 31 may be, for example, a stainless steel plate such as SUS304. A thickness of the metal plate such as a stainless steel plate is, for example, 0.2 millimeter to 0.8 millimeter, which is appropriately used corresponding to a voltage value and the like applied to the piezoelectric element 7. The reinforcing member 31 may be, for example, a resin plate. Examples of the resin for forming the resin plate include, but are not limited to, a polyamide resin. Examples of the polyamide resin include, but are not limited to, Reny (registered trademark) that is made of a crystalline thermoplastic resin obtained from metaxylylene diamine and adipic acid and has high strength and elasticity. Such a polyamide resin may be a reinforced resin reinforced with glass fiber, metallic fiber, carbon fiber, or the like using the polyamide resin itself as a base polymer. The strength and the elasticity of the reinforced resin are appropriately adjusted corresponding to an amount of the glass fiber, the metallic fiber, the carbon fiber, or the like added to the polyamide resin. The reinforced resin is formed by, for example, impregnating a base material with a resin to cure it, the base material being formed by knitting the glass fiber, the metallic fiber, the carbon fiber, or the like. The reinforced resin may be formed by mixing finely cut fiber fragments in liquid resin and curing it. The reinforced resin may be formed by laminating a resin layer and a base material in which fibers are knitted in.

The following advantageous effects can be obtained by arranging the reinforcing member 31 between the piezoelectric element 7 and the panel 20. When an external force is applied to the panel 20, it is possible to reduce the possibility that the external force is transmitted to the piezoelectric element 7 and the piezoelectric element 7 is damaged. For example, when the mobile phone 1C falls on the ground and the external force is applied to the panel 20, the external force is first transmitted to the reinforcing member 31. The reinforcing member 31 has certain elasticity, so that it is elastically deformed by the external force transmitted from the panel 20. Accordingly, at least part of the external force applied to the panel 20 is absorbed by the reinforcing member 31, which reduces the external force transmitted to the piezoelectric element 7. Due to this, it is possible to reduce the possibility that the piezoelectric element 7 is damaged. In a case in which the reinforcing member 31 is arranged between the piezoelectric element 7 and the housing 40, it is possible to reduce the possibility that, for example, the mobile phone 1C falls on the ground to deform the housing 40, and the deformed housing 40 collides with and damages the piezoelectric element 7.

The vibration caused by the expansion/contraction or bent of the piezoelectric element 7 is transmitted, first of all, to the reinforcing member 31, and further to the panel 20. That is, the piezoelectric element 7 vibrates, first of all, the reinforcing member 31 having an elastic modulus larger than that of the piezoelectric element 7, and thereafter vibrates the panel 20. Accordingly, the piezoelectric element 7 of the mobile phone 1C is not excessively deformed as compared to a structure without the reinforcing member 31 in which the piezoelectric element 7 is joined to the panel 20 with the joining member 30. Due to this, a deformation amount (degree of deformation) of the panel 20 can be adjusted. This structure is especially effective for the panel 20 that hardly inhibits the deformation of the piezoelectric element 7.

Figure 18:
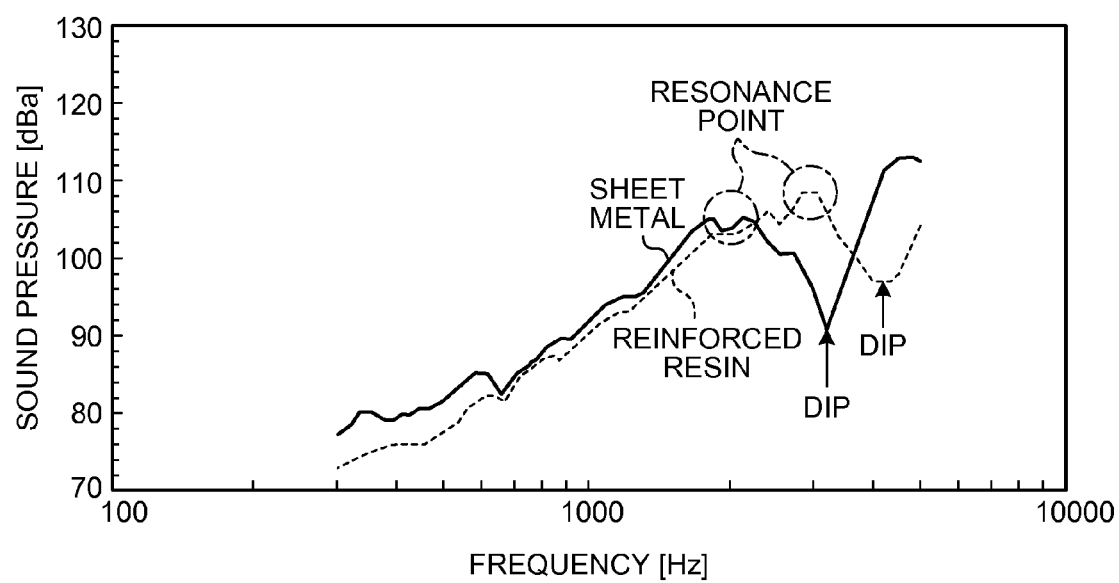
FIG. 18 is a diagram illustrating an example of a resonance frequency of the panel.

By arranging the reinforcing member 31 between the piezoelectric element 7 and the panel 20, as illustrated in FIG. 18, a resonance frequency of the panel 20 is lowered and an acoustic characteristic of a low frequency band is improved. FIG. 18 is a diagram illustrating an example of a change in a frequency characteristic caused by the reinforcing member 31. FIG. 18 illustrates the frequency characteristic in a case of using the sheet metal such as SUS304 described above as the reinforcing member 31, and the frequency characteristic in a case of using the reinforced resin such as Reny described above as the reinforcing member 31. The horizontal axis represents a frequency and the vertical axis represents a sound pressure. A resonance point in a case of using the reinforced resin is about 2 kHz, and a resonance point in a case of using the sheet metal is about 1 kHz. A dip in a case of using the reinforced resin is about 4 kHz, and a dip in a case of using the sheet metal is about 3 kHz. That is, in the case of using the reinforced resin, the resonance point of the panel 20 is positioned in a higher frequency region and the dip of the frequency characteristic is positioned in a higher frequency region than those in the case of using the sheet metal. A frequency band used for voice communication with a mobile phone is 300 Hz to 3.4 kHz, so that the dip can be prevented from being included in a use frequency band of the mobile phone 1C in the case of using the reinforced resin as the reinforcing member 31. Even when the sheet metal is used as the reinforcing member 31, the dip can be prevented from being included in the use frequency band of the mobile phone 1C by appropriately adjusting a type or composition of metal constituting the sheet metal, the thickness of the sheet metal, or the like. Comparing the reinforced resin with the sheet metal, influence of the reinforced resin on antenna performance is less than that of the sheet metal. Advantageously, the acoustic characteristic is not easily changed with the reinforced resin because the reinforced resin is not easily plastically deformed as compared to the sheet metal. A temperature rise in sound generation is suppressed with the reinforced resin as compared to the sheet metal. A plate-shaped weight may be attached to the piezoelectric element 7 with the joining member 30 instead of the reinforcing member 31.

When the electric signal is applied to the piezoelectric element 7, the panel 20 is vibrated corresponding to the deformation (expansion/contraction or bend) of the piezoelectric element 7, and generates the air conduction sound and the vibration sound transmitted via part of a human body (for example, the auricular cartilage) being in contact with the panel 20. The touch screen 21 is arranged to cover substantially the entire front surface of the panel 20.

Figure 19:
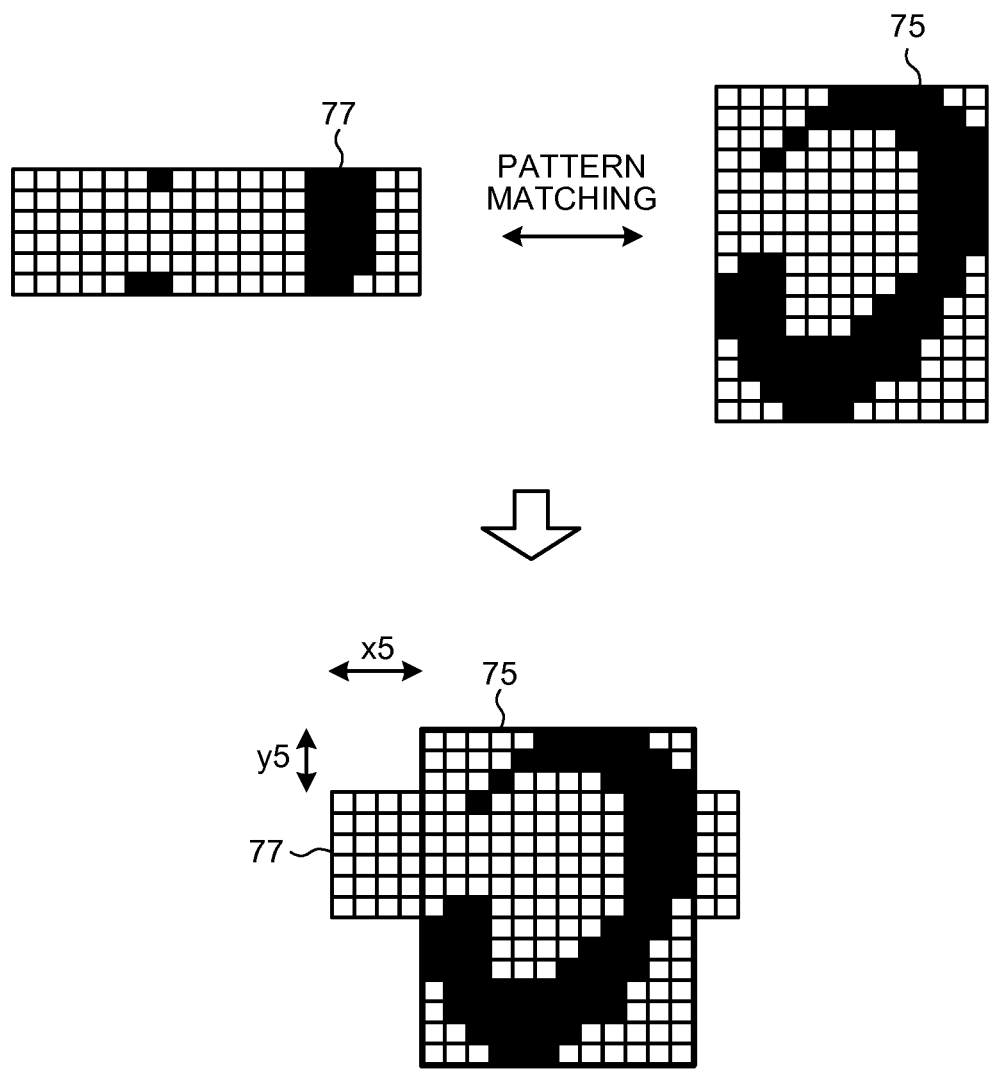
FIG. 19 is a diagram for explaining the detection of the position of the ear.

When the user of the mobile phone 1C having such a configuration brings his/her ear into contact with the panel 20 to listen to the vibration sound, part of the ear comes into contact with the touch screen 21 even though the touch screen 21 is smaller than the ear. Accordingly, an image 77 as illustrated in FIG. 19 can be obtained by dividing a detection region of the touch screen 21 in a grid pattern and converting a detection state of the contact of the ear in each of the divided regions into a state of a corresponding pixel.

When the image 77 is obtained, the mobile phone 1C obtains, by pattern matching, a relative position between the image 77 and the sample 75 when both of them optimally match with each other. In a case of the example in FIG. 19, the image 77 optimally matches with the sample 75 when the sample 75 is shifted in the X-axis direction by x5 and in the Y-axis direction by −y5, using the upper left of the image 77 as a reference. In this case, the position of the ear is calculated as follows: (x5, −y5). The mobile phone 1C can also detect the position of the ear using the sample 74 including the standard position 74a.

As described above, even when the touch screen 21 is arranged so as not to be overlapped with the display 2, the mobile phone 1C can detect the position of the ear being in contact with the panel 20 by using the touch screen 21. Accordingly, similarly to the mobile phone 1A, the mobile phone 1C can perform the control for guiding the position of the ear to the standard position.

Figure 20:
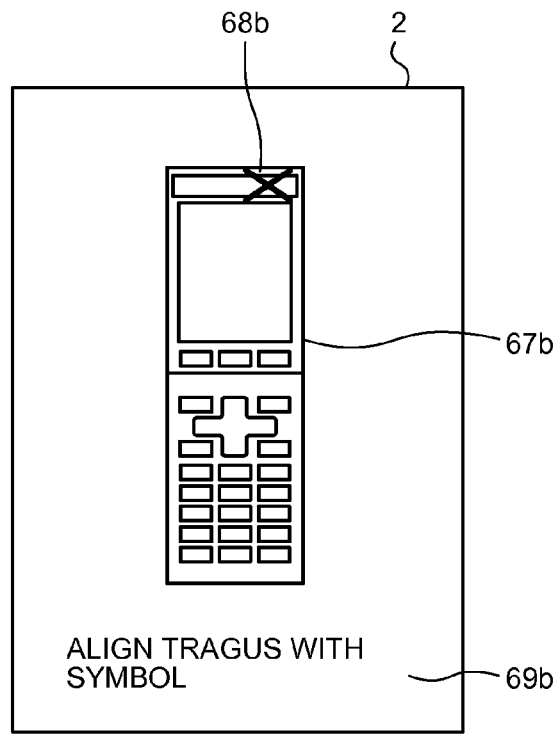
FIG. 20 is a diagram for explaining guidance that is performed before contact.

However, in the mobile phone 1C, when the display 2 displays the information for guiding the ear coming into contact with the panel 20 to the standard position, the position where the information is to be displayed may be the outside of the display region of the display 2. Then, as illustrated in FIG. 20, the mobile phone 1C displays the entire view 67b of the mobile phone 1C and a message 69b on the display 2, and arranges a symbol 68b on the entire view 67b.

Other Embodiments

The embodiments disclosed herein can include obvious knowledge of those skilled in the art, and can be modified within a range not departing from the gist and scope of the invention. The embodiments disclosed herein and the modification thereof can be appropriately combined. For example, the embodiments described above may be modified as follows.

For example, each computer program illustrated in FIG. 5 may be divided into a plurality of modules or may be combined with the other computer program.

In the example of above embodiments, the position of the object being in contact with the panel 20 is detected using the touch screen 21. However, a detection unit for detecting the position of the object is not limited to the touch screen 21. For example, the detection unit for detecting the position of the object may be the camera 12. In this case, the position of the object is detected based on an image obtained by the camera 12.

In the example of above embodiments, the movement of the object being in contact with the panel 20 is detected using the touch screen 21. However, the detection unit for detecting the movement of the object is not limited to the touch screen 21. For example, the movement of the object may be detected based on the image obtained by the camera 12 or may be detected by the acceleration sensor included in the attitude detection unit 15.

In the example of above embodiments, the guiding is performed assuming that the object being in contact with the panel 20 is an ear. However, the mobile phones 1A to 1C may determine whether or not the object being in contact with the panel 20 is an ear to perform the guiding only when the object is an ear. In this way, the control process can be switched depending on a situation such that the guiding of the position of the ear is performed when the ear is in contact with the panel 20, and processing corresponding to a contact operation is performed when a finger is in contact with the panel 20. It is possible to determine whether or not the object being in contact with the panel 20 is an ear by increasing accuracy of pattern matching with the sample, for example.

The mobile phones 1A to 1C may be configured to be able to cope with a plurality of users. In this case, the standard position is stored in the setting data 9Z for each user. Each of the mobile phones 1A to 1C determines which user's ear registered in advance is the object being in contact with the panel 20, and guides the ear to the standard position corresponding to the determined user. It is possible to determine which user's ear is the object being in contact with the panel 20 by preparing, for example, a sample for each user. Alternatively, it is possible to determine which user's ear is the object being in contact with the panel 20 by determining the position with which the ear is first brought into contact with, differently for each user.

The above embodiment illustrates an example of the use of the piezoelectric element 7 as a guiding section for guidance to the standard position. However, the guiding section may be any unit so long as the user can move his/her ear to the standard position while keeping the ear in contact with the panel 20. For example, the guiding section may be the vibrator 18 or the speaker 11. When the vibrator 18 is used as the guiding section, the guidance can be performed by changing strength or a frequency of vibration with the vibrator 18. When the speaker 11 is used as the guiding section, the guidance can be performed by using the sound output from the speaker 11. The guidance may be performed by using a plurality of guiding sections at the same time.

The above embodiment illustrates an example of the recording of the detected position of the ear to update the standard position while performing the control for the guidance to the standard position. However, these operations may be performed at different timings. For example, the mobile phones 1A to 1C may be configured to perform the control for guidance to the standard position after the object being in contact with the panel 20 is detected and until a predetermined condition is satisfied, and start to record the detected position of the ear thereafter. The predetermined condition is that the difference between the position of the ear and the standard position becomes smaller than the threshold, or a certain period of time elapses. With such a configuration, the detected position of the ear can be recorded to update the standard position in a state of not being influenced by the change in the control for guidance.

The above embodiment illustrates a process in which the mobile phone performs guidance to the standard position. However, the embodiment is not limited thereto. The mobile phone may make a notification related to a specific position by displaying information related to the specific position on the display 2. For example, the mobile phone may display, on the display 2, information related to a specific position (optimum position) at which the vibration sound is the most easily transmitted to the user. For example, in the mobile phone 1A illustrated in FIG. 1, the optimum position is a region of about 1 cm below the region of the panel 20 to which the piezoelectric element 7 is attached (region immediately above the piezoelectric element 7). When the user holds part of his/her ear to the optimum position, the vibration sound is the most easily transmitted to the user. The optimum position may vary depending on various parameters such as dimensions of the panel 20, material of the panel 20, or vibration amplitude of the piezoelectric element 7.

As described above, the region immediately above the piezoelectric element does not necessarily correspond to the optimum position at which the vibration sound is most easily transmitted to the user. This is due to a relation between the position to which the piezoelectric element is attached on the panel and a position at which the user's ear is in contact with the panel. In FIG. 1, the piezoelectric element 7 is arranged near one end of the panel 20 at a predetermined distance. A degree of deformation of the panel 20 caused by deformation of the piezoelectric element 7 becomes smaller in a region further away from the region to which the piezoelectric element 7 is attached. That is, the vibration of the panel 20 is attenuated as moving away from the region to which the piezoelectric element 7 is attached. On the other hand, as the position at which the user's ear is in contact with the panel is closer to the center of the panel, the external auditory meatus is blocked by the entire panel and an ambient sound (noise) coming into the external auditory meatus is reduced. Considering both of the degree of attenuation of the vibration and magnitude of the ambient sound coming into the external auditory meatus described above, a ratio between the magnitude of the vibration sound and the noise (S/N ratio) is the maximum when the user holds his/her ear to the region of about 1 cm below the region of the panel 20 immediately above the piezoelectric element.

Figure 21:
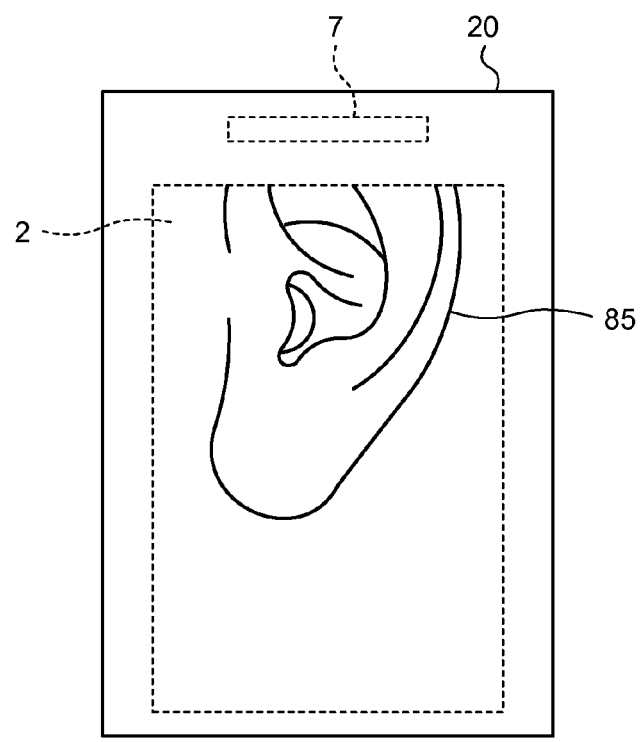
FIG. 21 is a diagram illustrating an example of displaying an image imitating the shape of the ear on a display.

As illustrated in FIG. 21, the mobile phone may preferably display, on the display 2, an image imitating the shape of the ear as information indicating the optimum position. The mobile phone displays, on the display 2, an image 85 imitating the shape of the ear so that the tragus corresponds to the optimum position of the panel 20, for example. When the image 85 imitating the shape of the ear matches a contact pattern detected by the touch screen 21, the air conduction sound and the vibration sound may be preferably generated.

The specific position (optimum position) may be notified to the user by arranging a projection (projecting portion) having a predetermined shape to the panel 20 or a housing 40. The projection is arranged, for example, to a position along the contour of the helix when the ear is in contact with the optimum position, or a position of the tragus when the ear is in contact with the optimum position. In this case, the user can recognize the optimum position when part of the ear is in contact with the projection. That is, the projection functions as one of notification parts of the present application. Alternatively, a notch (recessed part) may be formed on the panel 20 or the housing 40.

In the example of the above embodiments, the display 2 is attached to the back surface of the panel 20 with the joining member 30 in the mobile phone 1A. Alternatively, the mobile phone 1A may be configured such that there is a space between the panel 20 and the display 2. By providing a space between the panel 20 and the display 2, the panel 20 is easily vibrated, and a range in which the vibration sound can be easily heard is widened on the panel 20.

In the example of the above embodiments, the piezoelectric element 7 is attached to the panel 20. Alternatively, the piezoelectric element 7 may be attached to another place. For example, the piezoelectric element 7 may be attached to a battery lid. The battery lid is a member attached to the housing 40 to cover a battery. The battery lid is typically attached to a surface different from the display 2 in a mobile electronic device such as a mobile phone. According to such a configuration, the user can listen to the sound by bringing part of his/her body (for example, an ear) into contact with the surface different from the display 2. The piezoelectric element 7 may be configured to vibrate a corner part (for example, at least one of four corners) of the housing 40. In this case, the piezoelectric element 7 may be configured to be attached to an inner surface of the corner part of the housing 40, or may be configured such that an intermediate member is further provided and the vibration of the piezoelectric element 7 is transmitted to the corner part of the housing 40 via the intermediate member. According to such a configuration, a vibration range can be relatively narrowed, so that the air conduction sound caused by the vibration does not easily leak out. In addition, according to this configuration, the air conduction sound and the vibration sound are transmitted to the user in a state in which the user inserts the corner part of the housing into the external auditory meatus, so that surrounding noises are not easily transmitted to the external auditory meatus of the user. Accordingly, the quality of the sound transmitted to the user can be improved.

In the above embodiment, the reinforcing member 31 is a plate member. However, the shape of the reinforcing member 31 is not limited thereto. The reinforcing member 31 may be, for example, larger than the piezoelectric element 7, and an end thereof may be curved to the piezoelectric element 7 side to cover a side of the piezoelectric element 7. The reinforcing member 31 may include, for example, a plate portion and an extended portion that is extended from the plate portion to cover the side of the piezoelectric element 7. In this case, the extended portion is preferably separated from the side of the piezoelectric element 7 by a predetermined distance. Due to this, the extended portion hardly inhibits the deformation of the piezoelectric element.

In the above embodiments, the mobile phone is described as an example of a device according to the appended claims. However, the device according to the appended claims is not limited to the mobile phone. The device according to the appended claims may be a mobile electronic device other than the mobile phone. Examples of the mobile electronic device include, but are not limited to, a tablet, a portable personal computer, a digital camera, a media player, an electronic book reader, a navigator, and a gaming device.

The characteristic embodiments have been described above to completely and clearly disclose the technique according to the appended claims. However, the appended claims are not limited to the embodiments described above. The appended claims should be configured to realize all modifications and alternative configurations conceivable by those skilled in the art within a range of basic items disclosed in this specification.

The invention claimed is:
1. An electronic device, comprising:
a piezoelectric element;
a sound generating unit configured to be vibrated by the piezoelectric element and generate a vibration sound to be transmitted by vibrating a part of a human body of a user; and
a detection unit configured to detect a contact position of the part of the human body on the sound generating unit, wherein
the electronic device is configured to provide, for the user, a notification of a specific position on the sound generating unit,
the sound generating unit is configured to start generating a guidance sound for guiding the part of the human body to the specific position when a difference between the contact position and the specific position is greater than a threshold, and
the sound generating unit is configured to start generating the vibration sound other than the guidance sound when the difference between the contact position and the specific position becomes smaller than the threshold.
2. The electronic device according to claim 1, wherein the specific position is a position to which the part of the human body is preferably held.
3. The electronic device according to claim 1, wherein the sound generating unit is configured to change sound volume or tone of the guidance sound in accordance with the difference between the contact position and the specific position.
4. The electronic device according to claim 3, wherein the sound generating unit is configured to generate the guidance sound closer to a predetermined vibration sound as the contact position approaches the specific position.

5. The electronic device according to claim 3, wherein the specific position is changed based on the contact position.

6. The electronic device according to claim 1, wherein the electronic device is configured to provide the notification when the part of the human body is an ear.

7. The electronic device according to claim 6, wherein
the detection unit is configured to
detect a contact range of the part of the human body with respect to the sound generating unit, and
determine whether or not the part of the human body is an ear based on the detected contact range.

8. The electronic device according to claim 1, further comprising:
a display, wherein
the notification comprises displaying information indicating the specific position on the display.

9. The electronic device according to claim 8, wherein the information indicating the specific position is an image of an ear.

10. The electronic device according to claim 9, wherein
the detection unit is configured to detect a contact range of the part of the human body with respect to the sound generating unit, and
the sound generating unit is configured to start generating the vibration sound when the image of the ear matches a contact pattern of an ear being in contact with the sound generating unit.

11. The electronic device according to claim 1, wherein the sound generating unit is a panel.

12. The electronic device according to claim 11, wherein a region of the panel to be vibrated is larger than a region having a length corresponding to a distance between an inferior crus of antihelix to an antitragus of a human ear and a width corresponding to a distance between a tragus and an antihelix.

13. The electronic device according to claim 11, wherein the panel configures a part of or the entirety of any one of a display panel, an operation panel, a cover panel, and a lid panel for enabling a rechargeable battery to be removable.

14. The electronic device according to claim 13, wherein
the panel is a display panel, and
the piezoelectric element is arranged outside a display region for a display function of the display panel.

15. The electronic device according to claim 11, wherein the panel is deformable for transmitting the vibration sound at any portion of the panel.

16. The electronic device according to claim 11, wherein
the panel comprises a plurality of portions vibrated in a direction intersecting with a principal plane of the panel in a vibrating region thereof, and
a value of amplitude of the vibration is changed from positive to negative or vice versa with time, at each of the portions.

17. The electronic device according to claim 1, wherein the sound generating unit is configured, when vibrated by the piezoelectric element, to generate an air conduction sound and the vibration sound.

18. A control method performed by an electronic device that comprises a sound generating unit and a piezoelectric element, the control method comprising:
notifying a user of a specific position on the sound generating unit;
detecting a contact position of a part of a human body of the user on the sound generating unit;
when a difference between the contact position and the specific position is greater than a threshold,
starting generating a guidance sound for guiding the part of the human body to the specific position by vibrating the sound generating unit with the piezoelectric element; and
when the difference between the contact position and the specific position becomes smaller than the threshold,
starting generating a vibration sound other than the guidance sound by vibrating the sound generating unit with the piezoelectric element, wherein the vibration sound is to be transmitted by vibrating the part of the human body.

19. A non-transitory storage medium that stores a control program that causes, when executed by an electronic device that comprises a sound generating unit and a piezoelectric element, the electronic device to execute:
notifying a user of a specific position on the sound generating unit;
detecting a contact position of a part of a human body of the user on the sound generating unit;
when a difference between the contact position and the specific position is greater than a threshold,
starting generating a guidance sound for guiding the part of the human body to the specific position by vibrating the sound generating unit with the piezoelectric element; and
when the difference between the contact position and the specific position becomes smaller than the threshold,
starting generating a vibration sound other than the guidance sound by vibrating the sound generating unit with the piezoelectric element, wherein the vibration sound is to be transmitted by vibrating the part of the human body.

* * * * *